(12) United States Patent
Takahashi et al.

(10) Patent No.: US 7,242,645 B2
(45) Date of Patent: Jul. 10, 2007

(54) OPTICAL DISC PLAYER WITH FOCUS PULL-IN FUNCTION

(75) Inventors: Kazuo Takahashi, Tsurugashima (JP); Mitsuru Sato, Tsurugashima (JP); Yoshitsugu Araki, Tsurugashima (JP)

(73) Assignee: Pioneer Corporation, Tokyo (JP)

( * ) Notice: Subject to any disclaimer, the term of this patent is extended or adjusted under 35 U.S.C. 154(b) by 635 days.

(21) Appl. No.: 10/252,008

(22) Filed: Sep. 23, 2002

(65) Prior Publication Data

US 2003/0067850 A1     Apr. 10, 2003

(30) Foreign Application Priority Data

Oct. 1, 2001   (JP)   ............................. 2001-305151

(51) Int. Cl.
    *G11B 7/00*   (2006.01)
(52) U.S. Cl. ............... 369/44.29; 369/44.27; 369/53.23; 369/53.28
(58) Field of Classification Search ............ 369/44.25, 369/44.29, 44.32, 44.16, 44.27, 44.41, 53.19, 369/53.23, 53.34, 53.37, 112.02, 53.15, 47.44
See application file for complete search history.

(56) References Cited

U.S. PATENT DOCUMENTS

| | | | |
|---|---|---|---|
| 4,541,084 A | 9/1985 | Oku et al. ..................... 369/45 |
| 4,683,560 A | 7/1987 | Takeuchi et al. .............. 369/45 |
| 6,246,648 B1 * | 6/2001 | Kuribayashi ............. 369/44.32 |
| 6,424,605 B1 * | 7/2002 | Iida .......................... 369/44.27 |
| 6,510,111 B2 * | 1/2003 | Matsuura ................. 369/44.32 |
| 6,747,921 B2 * | 6/2004 | Wakabayashi et al. ... 369/44.16 |
| 6,754,154 B1 * | 6/2004 | Takeda et al. ........... 369/53.19 |

* cited by examiner

*Primary Examiner*—Andrea Wellington
*Assistant Examiner*—Kim-Kwok Chu
(74) *Attorney, Agent, or Firm*—Drinker Biddle & Reath LLP

(57) ABSTRACT

An optical disc player executes a focus pull-in operation while avoiding an inconvenience that an objective lens comes into contact with an optical disc, or the like. The objective lens is forcedly moved gradually from a position that is away from the surface of the optical disc and outside a capture range of a focus servo toward the surface of the optical disc. When the objective lens reaches the capture range of the focusing servo loop by the moving operation and a distance between the objective lens and the disc surface is at the minimum distance or is changing in a widening direction, the moving operation of the objective lens is stopped.

9 Claims, 17 Drawing Sheets

OPTICAL DISC PLAYER WITH FOCUS PULL-IN FUNCTION

BACKGROUND OF THE INVENTION

1. Field of the Invention

The invention relates to an optical disc player having a focus pull-in function.

2. Description of Related Art

Nowadays, a multilayer optical disc is known as a type of optical recording medium, in which a plurality of recording layers for recording information data are provided in a single disc. For example, two recording layers separated by a spacer layer forming a relatively small gap are provided in a two-layer DVD (Digital Versatile Disc). Upon recording or reproduction to/from the double-layer optical disc, a laser beam is condensed onto one of the two recording layers and the recording or reproduction of information data is executed to the recording layer. In the recording or reproducing operation, there is a case where a focal position of the laser beam is changed from one recording layer to the other recording layer. The operation such that the focal position of the laser beam is changed to the other recording layer as mentioned above is generally called "focus jump". Upon focus jump, first, an objective lens is forcedly moved to a position near the optical disc and pulled into a capture range of a focusing servo loop and, subsequently, the focusing servo loop is set to a closed state. Also in a single-layer optical disc having one recording layer, at the time of the initial operation, what is called "focus pull-in" is executed such that the objective lens is forcedly moved to a position near the surface of the optical disc and pulled into a capture range of a focusing servo loop and, subsequently, the focusing servo loop is set to a closed state.

However, if the surface oscillation of the optical disc is large in the state that the servo loop is closed, an inconvenience can occur such that a speed of approaching to the disc surface when viewed from the objective lens becomes excessively high, so that the focus pull-in fails, and the objective lens comes into contact with the optical disc, or the like.

OBJECTS AND SUMMARY OF THE INVENTION

The invention has been made in view of the above-mentioned point and it is an object of the invention to provide an optical disc player which can preferably execute a focus pull-in of an objective lens to an optical disc.

According to the invention, there is provided an optical disc player for reproducing recording information recorded on an optical disc on the basis of reflection light which is obtained when a laser beam condensed by an objective lens is projected onto a recording surface of the rotating optical disc, comprising: a surface oscillation detecting component for detecting a change in distance between the objective lens and the surface of the optical disc as a surface oscillation of the optical disc; an objective lens moving component for forcedly gradually moving the objective lens, from a position which is apart from the surface of the optical disc and outside a capture range of a focusing servo loop, toward the surface of the optical disc; and an objective lens movement stop control component for stopping the moving operation which is executed by the objective lens moving means when the objective lens has reached the capture range of the focusing servo loop by the moving operation by the objective lens moving component and it is detected by the surface oscillation detecting component that the distance between the objective lens and the surface is at a minimum distance or is changing in a widening direction.

DETAILED DESCRIPTION OF THE PREFERRED EMBODIMENTS

An embodiment of the invention will be described below with reference to the drawings.

Figure 1:
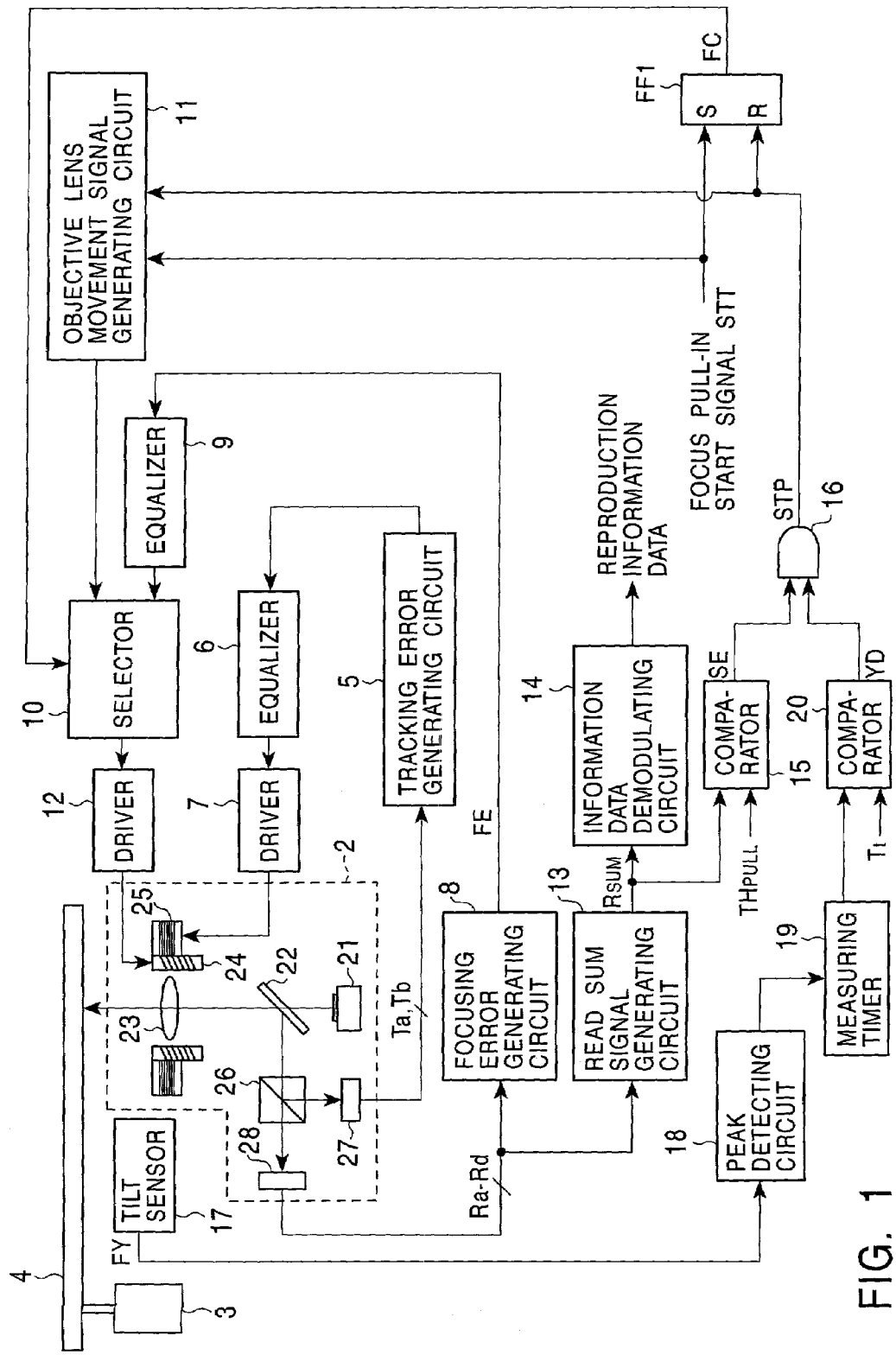
FIG. 1 is a diagram showing the construction of a disc player as an optical information reproducing apparatus according to the invention.

FIG. 1 is a diagram showing a construction of a disc player as an optical information reproducing apparatus according to the invention.

In FIG. 1, a pickup 2 reads recording information from an optical disc 4 as an optical recording medium which is rotated by a spindle motor 3.

Figure 2B:
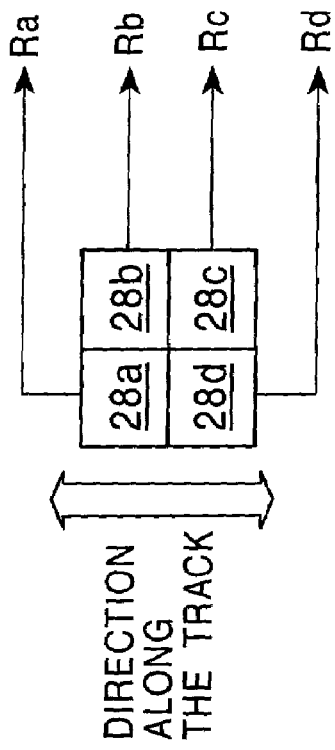
FIGS. 2A and 2B are diagrams each showing an arrangement of the photosensitive surface of a photodetector mounted in a pickup 2 of the disc player shown in FIG. 1.
Figure 2A:
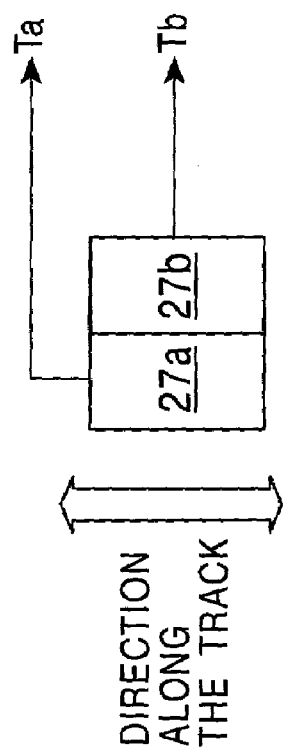

The pickup 2 comprises: a laser emitting device 21; a half mirror 22; an objective lens 23; a focusing actuator 24; a tracking actuator 25; a beam splitter 26; a first photodetector 27; and a second photodetector 28. The laser emitting device 21 emits a laser beam having a predetermined optical power. The laser beam is projected onto a recording layer of the optical disc 4 via the half mirror 22 and objective lens 23. In this arrangement, the reflected light from the optical disc 4 is guided to each of the first photodetector 27 and the second photodetector 28 via the objective lens 23, half mirror 22, and beam splitter 26. Before the reflection light which is guided to the second photodetector 28 reaches the photosensitive surface of the second photodetector 28, it passes through a cylindrical lens (not shown), so that astigmatism is applied to the reflection light. The first photodetector 27 receives the reflected light from the optical disc 4 as mentioned above by two photosensitive surfaces 27a and 27b arranged as shown in FIG. 2A, respectively. The first photodetector 27 generates read signals Ta and Td obtained by individually photoelectrically converting the reflection light received by the photosensitive surfaces 27a and 27b, respectively. The second photodetector 28 receives the reflected light from the optical disc 4 as mentioned above by four photosensitive surfaces 28a to 28d arranged as shown in FIG. 2B, respectively. The second photodetector 28 generates read signals Ra to Rd which are respectively obtained by photoelectrically converting the reflection light received at each of the photosensitive surfaces 28a to 28d.

A tracking error generating circuit 5 obtains a difference between the read signals Ta and Td and supplies it as a tracking error signal to an equalizer 6. The equalizer 6 supplies a tracking driving signal obtained by compensating phase characteristics of the tracking error signal to a driver 7. The driver 7 generates a tracking driving voltage according to the tracking driving signal and supplies it to the tracking actuator 25. The tracking actuator 25 shifts an optical axis of the objective lens 23 in the disc's radial direction in accordance with the tracking driving voltage so that the laser beam which is irradiated onto the optical disc 4 traces a recording track formed on the recording surface of the optical disc 4.

That is, a tracking servo loop is formed by the pickup 2, tracking error generating circuit 5, equalizer 6, driver 7, and tracking actuator 25.

A focusing error generating circuit 8 is operative to add the read signals from the photosensitive surfaces arranged at diagonal positions among the read signals Ra to Rd from the four photosensitive surfaces 28a to 28d in the second photodetector 28, respectively, and obtains a difference value between two addition signals as a focusing error signal FE. That is, the focusing error generating circuit 8 obtains the focusing error signal FE by the following arithmetic operation using the read signals Ra to Rd to which the astigmatism has been applied.

$$FE=(Ra+Rc)-(Rb+Rd)$$

An equalizer 9 supplies a phase compensation focusing error signal obtained by compensating phase characteristics of the focusing error signal FE to a selector 10. The selector 10 selects either the phase compensation focusing error signal or an objective lens movement signal supplied from an objective lens movement signal generating circuit 11 and supplies it as a focus driving signal to a driver 12. The operation of the objective lens movement signal generating circuit 11 and the selection control operation of the selector 10 will be explained hereinlater. The driver 12 generates a focus driving voltage according to the focus driving signal supplied from the selector 10 and supplies it to the focusing actuator 24. The focusing actuator 24 moves the objective lens 23 in the direction perpendicular to the disc, that is, on so called a focus adjustment trajectory by a distance corresponding to the focus driving voltage in order to allow a focal point of the laser beam to coincide with the recording surface of the optical disc 4.

That is, a focusing servo loop is formed by the pickup 2, focusing error generating circuit 8, equalizer 9, selector 10, driver 12, and focusing actuator 24.

A read sum signal generating circuit 13 obtains the addition result obtained by mutually adding the read signals Ra to Rd generated from the second photodetector 28 as a read sum signal $R_{SUM}$ as mentioned above and supplies it to each of an information data demodulating circuit 14 and a comparator 15. The information data demodulating circuit 14 reproduces the information data recorded on the optical disc 4 by executing a predetermined demodulating process to the read sum signal $R_{SUM}$ and generates it as reproduction information data.

The comparator 15 compares a signal level of the read sum signal $R_{SUM}$ and a pull-in threshold value $TH_{PULL}$. When the signal level of the read sum signal $R_{SUM}$ is smaller, the comparator 15 supplies a signal SE in a servo capture range of the logic level 0 to a gate 16. When the signal level of the read sum signal $R_{SUM}$ is larger, the comparator 15 supplies the signal SE in the servo capture range of the logic level 1 to the gate 16. The pull-in threshold value $TH_{PULL}$ is a value which can be obtained as a signal level of the read sum signal $R_{SUM}$ when the objective lens 23 exists at a lower limit position in a capture range of the focusing servo loop (that is, the farthest position from the recording surface).

A tilt sensor 17 detects surface oscillation of the optical disc 4, generates a surface oscillation signal FY having a waveform corresponding to the surface oscillating state, and supplies it to a peak detecting circuit 18. The tilt sensor 17 is attached at a position near the objective lens 23. The peak detecting circuit 18 generates a peak detection pulse PP each time a minimum value (or maximum value) of the signal level of the surface oscillation signal FY is detected and supplies it to a measuring timer 19. The measuring timer 19 initializes a present measurement value in accordance with the peak detection pulse PP, subsequently, starts the measuring operation, and successively supplies a measurement value to a comparator 20.

When the measurement value supplied from the measuring timer 19 is smaller than a predetermined value Tt, the comparator 20 generates a surface oscillation separating interval detection signal YD of the logic level 1 and supplies it to the gate 16. When the measurement value is larger than the predetermined value Tt, the comparator 20 generates the surface oscillation separating interval detection signal YD of the logic level 0 and supplies it to the gate 16. The predetermined value Tt is a time which is needed until the optical disc 4 is rotated by almost a half turn by the spindle motor 3.

So long as both of the signal SE in the servo capture range and the surface oscillation separating interval detection signal YD are at the logic level 1, the gate 16 generates an objective lens movement stop signal STP of the logic level 1 and supplies it to an R terminal of an RS flip-flop FF1. When a focus pull-in start signal STT is supplied to an S terminal of the RS flip-flop FF1, the RS flip-flop FF1 continuously supplies a focus pull-in control signal FC of the logic level 1 to the selector 10 in order to execute the focus pull-in operation. The focus pull-in start signal STT is generated from a system controller (not shown), for example, when a power source of the disc player is turned on or when the recording layer as a target to be read is changed to another recording layer. When the objective lens movement stop signal STP of the logic level 1 is supplied to the R terminal, the RS flip-flop FF1 continuously supplies the focus pull-in control signal FC of the logic level 0 to stop the focus pull-in operation to the selector 10.

Figure 3:
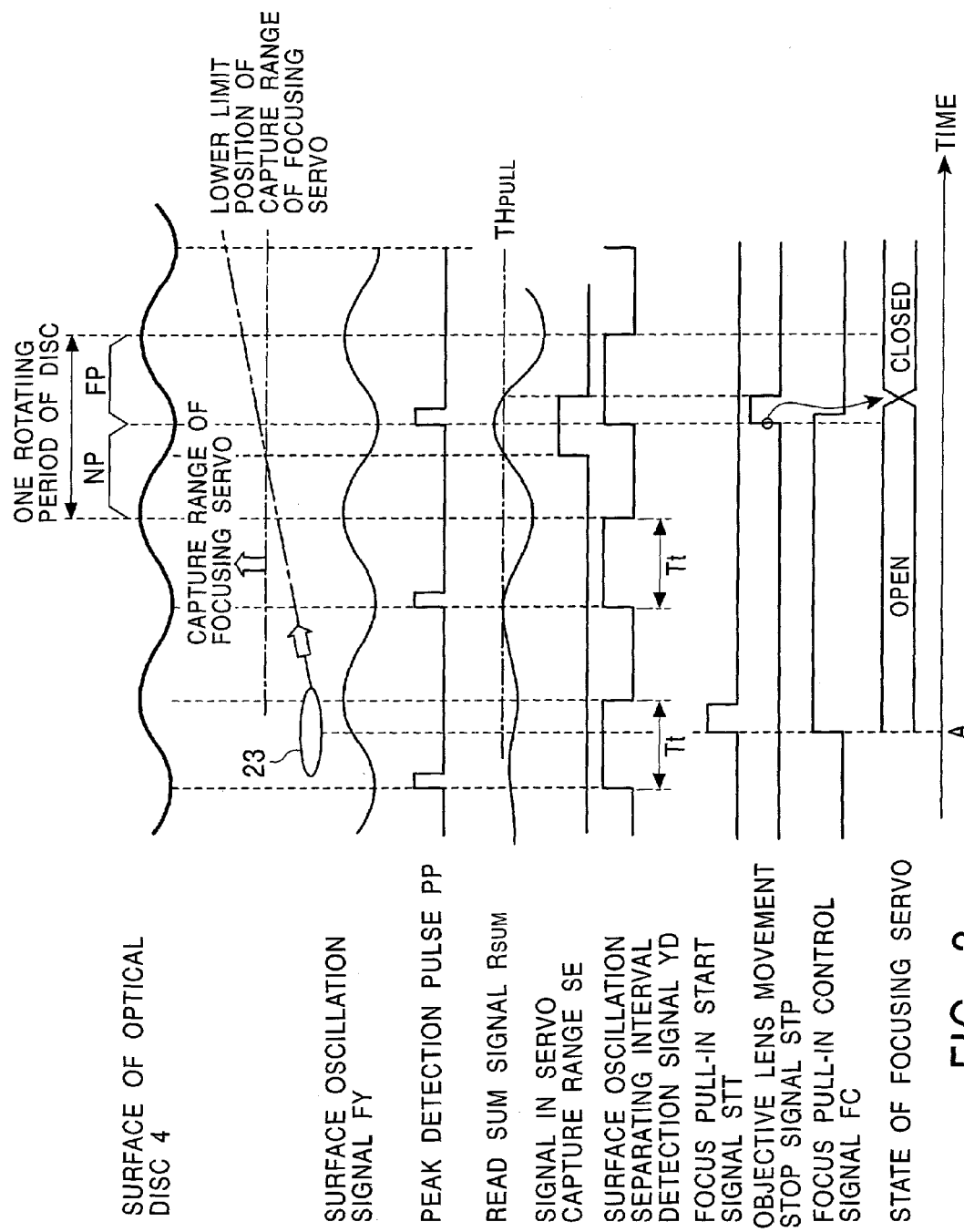
FIG. 3 is a diagram showing the focus pull-in operation of the disc player shown in FIG. 1.

When the focus pull-in start signal STT is supplied from the system controller (not shown), as shown in FIG. 3, the objective lens movement signal generating circuit 11 generates an objective lens movement signal to the selector 10 in order to gradually move the objective lens 23 in the direction of the recording surface of the optical disc 4. When the objective lens movement stop signal STP of the logic level 1 is supplied from the gate 16, the objective lens movement signal generating circuit 11 supplies the objective lens movement signal to the selector 10 in order to stop the movement of the objective lens 23. While the focus pull-in control signal FC of the logic level 0 to stop the focus pull-in operation is supplied, the selector 10 relay-supplies the phase compensation focusing error signal supplied from the equalizer 9 to the driver 12. While the focus pull-in control signal FC of the logic level 1 to execute the focus pull-in operation is supplied, the selector 10 relay-supplies the objective lens movement signal supplied from the objective lens movement signal generating circuit 11 to the driver 12.

The focus pull-in operation which is executed in the disc player shown in FIG. 1 will now be described with reference to FIG. 3.

Surface oscillation of one period occurs in the optical disc 4 by one rotation of the disc. According to the surface oscillation, while the optical disc 4 rotates once, a distance between the objective lens 23 and the optical disc 4 is narrowed gradually (approach interval NP) and, subsequently, both of them are gradually away from each other (separating interval FP). In this instance, the tilt sensor 17 generates the surface oscillation signal FY as shown in FIG. 3 having a waveform corresponding to the surface oscillating state. Further, the peak detecting circuit 18 generates the peak detection pulse PP as shown in FIG. 3 each time the signal level of the surface oscillation signal FY becomes the minimum value (or maximum value), that is, the distance between the objective lens 23 and the optical disc 4 is equal to the minimum interval by the influence of the surface oscillation. Each time the peak detection pulse PP is generated, therefore, the comparator 20 generates the surface oscillation separating interval detection signal YD of the logic level 1 only for a period of time shown by the predetermined value Tt from the generation of the peak detection pulse PP. That is, the comparator 20 generates the surface oscillation separating interval detection signal YD of the logic level 1 only when the surface oscillating state of the portion where the laser beam has been irradiated (on the recording surface of the optical disc 4) is in a surface oscillating state such that the distance between the objective lens 23 and the optical disc 4 is gradually widened (separating interval FP).

At a time point A shown in FIG. 3, first, the system controller (not shown) generates the focus pull-in start signal STT in order to focus the focal point of the laser beam onto a certain recording layer of the optical disc 4. In response to the focus pull-in start signal STT, the RS flip-flop FF1 generates the focus pull-in control signal FC of the logic level 1 as shown in FIG. 3. In response to the focus pull-in control signal FC of the logic level 1, the selector 10 supplies the objective lens movement signal generated by the objective lens movement signal generating circuit 11 to the driver 12. During this period of time, therefore, the focusing servo loop enters an open state and the focusing actuator 24 forcedly drives the objective lens 23 to approach to the surface of the optical disc 4 as shown in FIG. 3. As shown in FIG. 3, since the objective lens 23 exists at a position which is outside a capture range of the focusing servo loop and relatively away from the surface of the optical disc 4 just after the driving operation of the focusing actuator 24, a light intensity of the reflected light from the optical disc 4 is low. The signal level of the read sum signal $R_{SUM}$ obtained on the basis of the reflected light is, therefore, smaller than that of the pull-in threshold value $TH_{PULL}$ and the signal SE in the servo capture range which is generated from the comparator 15 is set to the logic level 0. The nearer the objective lens 23 approaches to the surface of the optical disc 4, the higher the light intensity of the reflected light from the optical disc 4 is. As shown in FIG. 3, therefore, an amplitude of the read sum signal $R_{SUM}$ increases and it is more easily influenced by the surface oscillation of the optical disc 4. In this state, according to the influence of the surface oscillation, the distance between the objective lens 23 and the surface of the optical disc 4 is steeply narrowed in the approach interval NP shown in FIG. 3 and gently narrowed in the separating interval FP. When the objective lens 23 enters the capture range of the focusing servo loop, the signal level of the read sum signal $R_{SUM}$ is higher than that of the pull-in threshold value $TH_{PULL}$ as shown in FIG. 3. The signal SE in the servo capture range which is generated from the comparator 15 is shifted from the logic level 0 to the logic level 1. In this instance, at a point when the surface oscillation separating interval detection signal YD is set to the logic level 1, the gate 16 generates the objective lens movement stop signal STP of the logic level 1 in order to stop the focus pull-in operation and supplies it to the RS flip-flop FF1 and objective lens movement signal generating circuit 11. The RS flip-flop FF1 shifts the focus pull-in control signal FC from the logic level 1 to the logic level 0 in response to the objective lens movement stop signal STP. The selector 10 relay-supplies the phase compensation focusing error signal supplied from the equalizer 9 to the driver 12 in place of the objective lens movement signal, thereby setting the focusing servo into the closed state. The movement of the objective lens is, therefore, stopped so as to allow the objective lens 23 to forcedly approach to the surface of the optical disc 4 and the focusing servo is made operative.

As mentioned above, in the focus pull-in operation in the disc player shown in FIG. 1, first, the objective lens is made to gradually approach to the optical disc from a position which is outside the capture range of the focusing servo loop and relatively far. When the objective lens exceeds the lower limit position of the capture range of the focusing servo loop and is in the surface oscillating state such that the distance between the objective lens and the disc surface is widened, the focus pull-in operation is stopped, thereby closing the focusing servo loop. While preventing the objective lens from coming into contact with the disc surface, therefore, the prompt focus pull-in operation is executed.

In the embodiment, the forced movement of the objective lens is stopped in a state where the distance between the objective lens and the disc surface is widened due to the influence of the surface oscillation, if the forced movement is executed at timing when the distance between them is equal to the minimum interval, the movement of the objective lens is stopped in the state such that the distance between them is widened.

Usually, as a result of the surface oscillation of the optical disc, a state where the distance between the objective lens and the optical disc is gradually narrowed and assumes the minimum distance occurs only once in one revolution of the disc. Similarly a state occurs only once in one revolution of the disc where the objective lens and the optical disc are moved gradually away from each other from the state of the minimum interval and the distance between them assumes the maximum distance. That is, the state of surface oscillation is synchronized with the rotation of the disc and a point of time when the distance between the objective lens and the optical disc assumes the minimum distance appears regularly almost at the same rotational phase. Therefore, it is sufficient that the objective lens is made to approach to the optical disc step by step for each rotation of the optical disc and, when the objective lens enters the capture range of the focusing servo loop, the focusing servo is closed.

Figure 4:
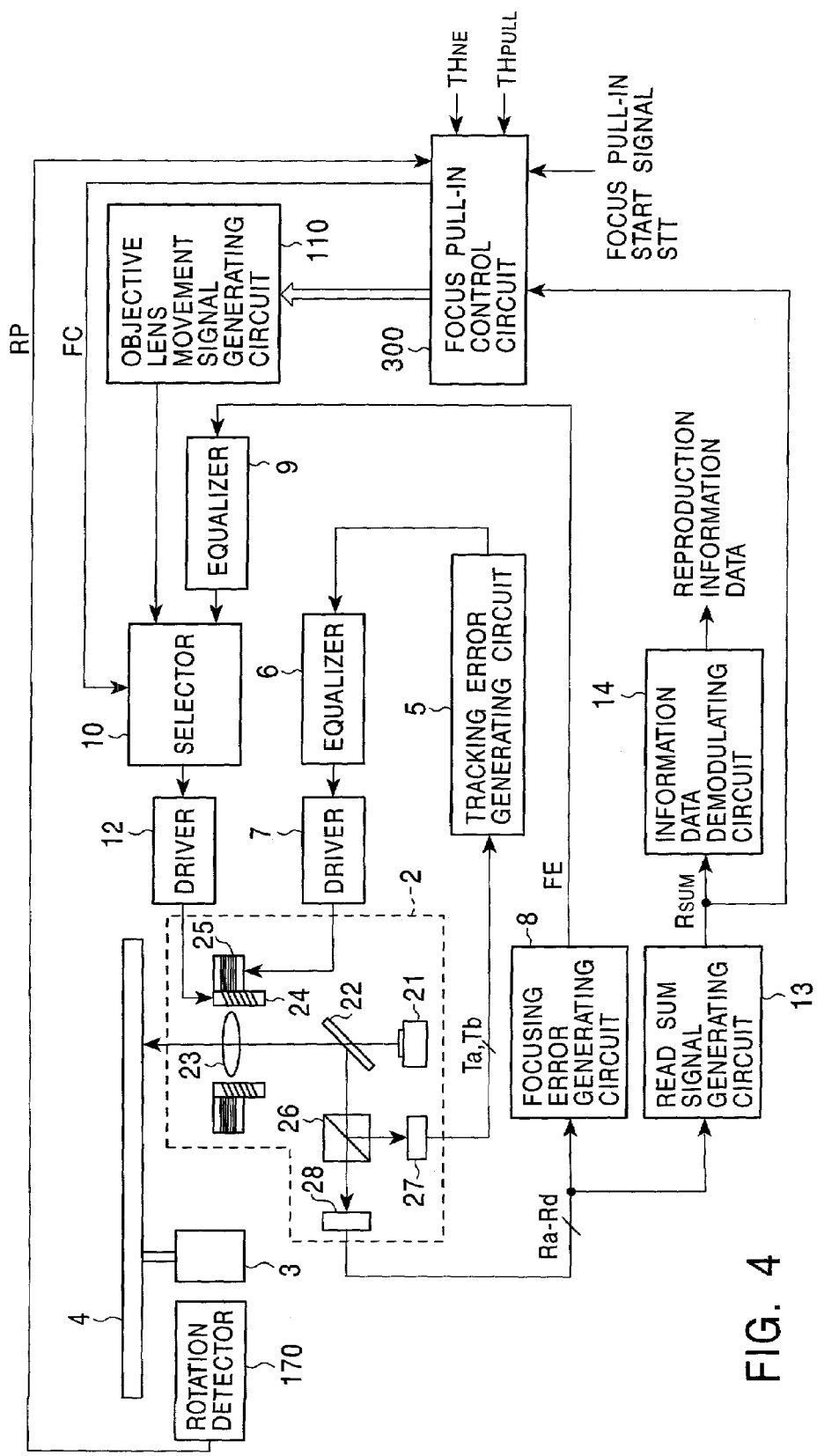
FIG. 4 is a diagram showing the construction of another embodiment of the disc player according to the invention.

FIG. 4 is a diagram showing another construction of a disc player made in consideration of the above viewpoint.

In the disc player shown in FIG. 4, the tilt sensor 17, peak detecting circuit 18, measuring timer 19, comparators 15 and 20, gate 16, and RS flip-flop FF1 shown in FIG. 1 are deleted, and a rotation detector 170 and a focus pull-in control circuit 300 are provided. An objective lens movement signal generating circuit 110 is used in place of the objective lens movement signal generating circuit 11 shown in FIG. 1. Since the other construction is similar to that shown in FIG. 1, the operation will be described hereinbelow mainly with respect to the rotation detector 170, objective lens movement signal generating circuit 110, and focus pull-in control circuit 300.

The rotation detector 170 generates a rotation detection pulse RP each time the optical disc 4 rotates once by the spindle motor 3 and supplies it to the focus pull-in control circuit 300. The objective lens movement signal generating circuit 110 generates the objective lens movement signal to move the objective lens 23 to a position on a focus adjustment trajectory according to a driving control signal supplied from the focus pull-in control circuit 300 and supplies it to the selector 10. The focus pull-in control circuit 300 executes a control according to a focus pull-in control flow as shown in FIG. 5 in response to the focus pull-in start signal STT generated by the system controller (not shown) in order to make the focusing servo operative for the recording layer of the optical disc 4.

Figure 5:
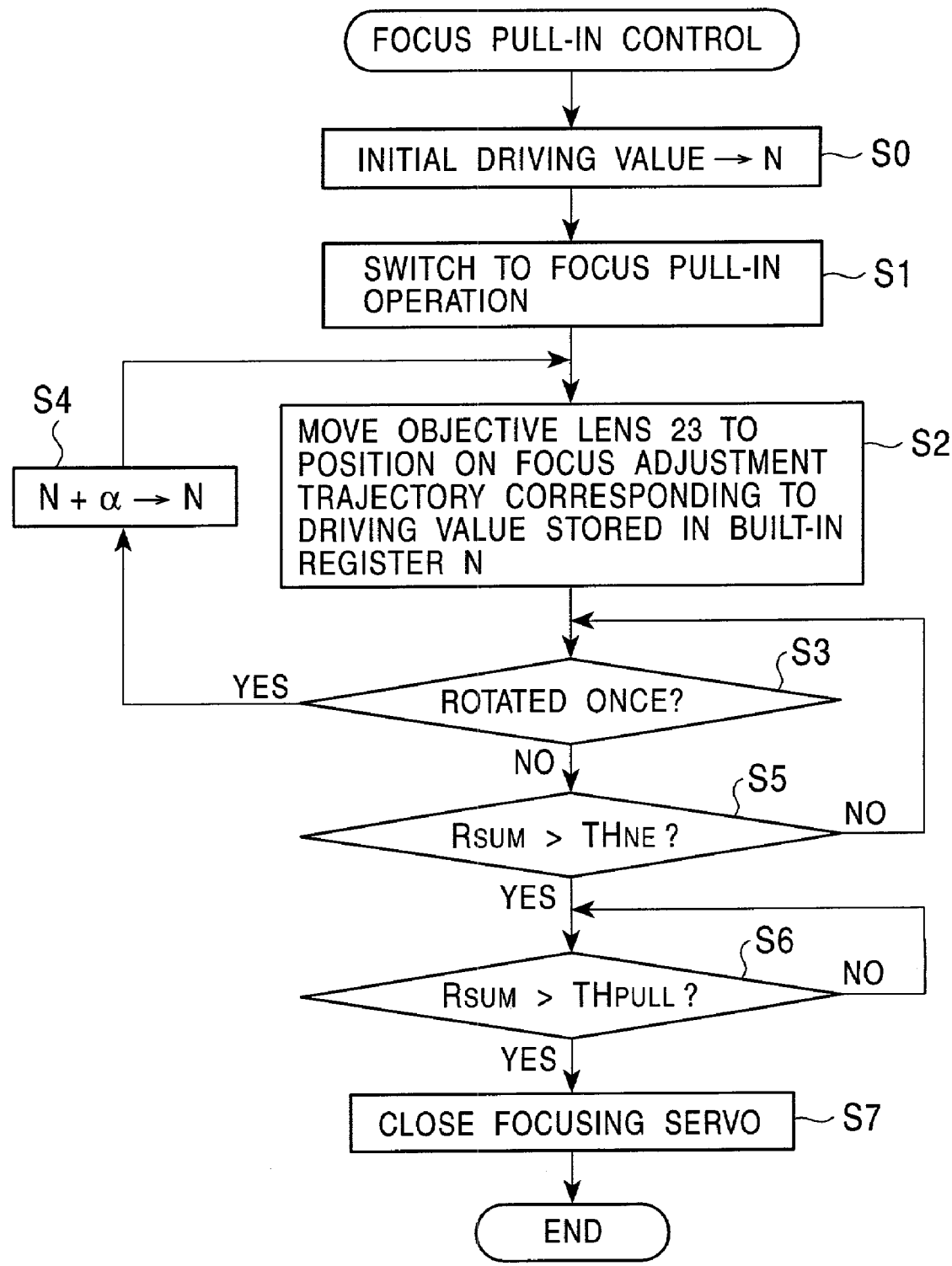
FIG. 5 is a diagram showing an example of a focus pull-in control flow which is executed by the disc player shown in FIG. 4.
Figure 6:
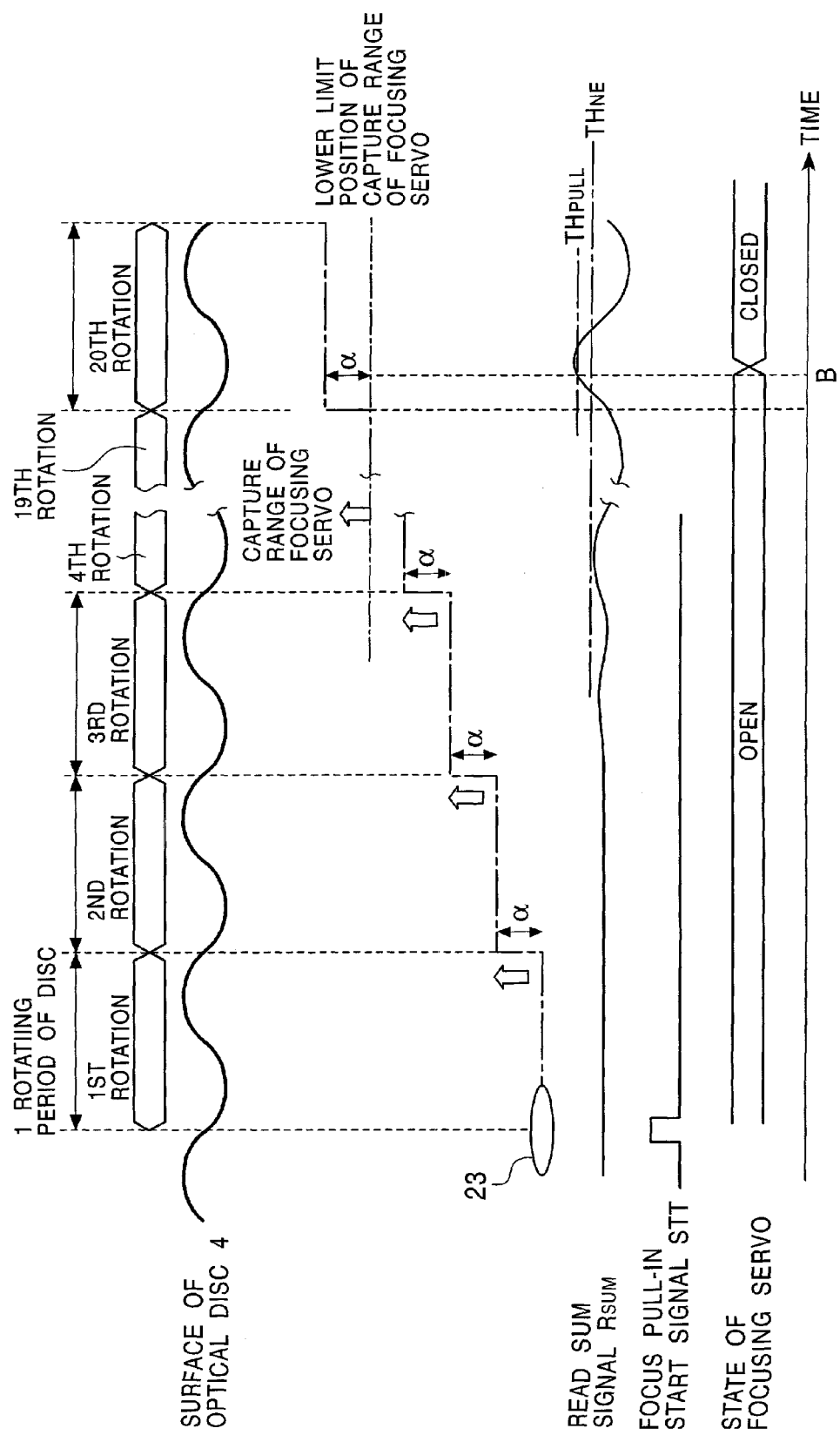
FIG. 6 is a diagram showing the focus pull-in operation by the execution of the focus pull-in control flow shown in FIG. 5.

In FIG. 5, first, the focus pull-in control circuit 300 stores a driving value for moving the objective lens 23 to a predetermined initial position on the focus adjustment trajectory into a built-in register N (not shown) (step S0). Subsequently, the focus pull-in control circuit 300 generates the focus pull-in control signal FC of the logic level 1 and supplies it to the selector 10 (step S1). By the execution of step S1, the selector 10 supplies the objective lens movement signal supplied from the objective lens movement signal generating circuit 110 to the driver 12. Subsequently, the focus pull-in control circuit 300 generates the movement driving control signal indicative of the driving value stored in the built-in register N and supplies it to the objective lens movement signal generating circuit 110 (step S2). By the execution of step S2, the focusing actuator 24 moves the objective lens 23 to the position on the focus adjustment trajectory corresponding to the driving value stored in the built-in register N. Subsequently, the focus pull-in control circuit 300 discriminates whether the optical disc 4 has rotated once or not on the basis of the rotation detection pulse RP supplied from the rotation detector 170 (step S3). In step S3, if it is determined that the optical disc 4 has rotated once, the focus pull-in control circuit 300 sets a value obtained by adding a predetermined value α to the driving value stored in the built-in register N to a new driving value and overwrite-stores it into the built-in register N (step S4). After the execution of step S4, the focus pull-in control circuit 300 returns to the execution of step S12 and repetitively executes the operation as mentioned above. According to the repetitive execution of steps S2 to S4, as shown in FIG. 6, the objective lens 23 approaches to the surface of the optical disc 4 by a distance corresponding to the predetermined value α each time the optical disc 4 rotates once.

If it is determined in step S3 that the optical disc 4 does not rotate once, the focus pull-in control circuit 300 discriminates whether the read sum signal $R_{SUM}$ is larger than a near threshold value $TH_{NE}$ or not (step S5). The near threshold value $TH_{NE}$ is a value which can be obtained as a signal level of the read sum signal $R_{SUM}$ when the objective lens 23 exists at a near position which is slightly away from the disc surface than the lower limit position in the capture range of the focusing servo loop. The near threshold value $TH_{NE}$ is, therefore, smaller than the pull-in threshold value $TH_{PULL}$. If it is determined in step S5 that the read sum signal $R_{SUM}$ is not larger than the near threshold value $TH_{NE}$, the focus pull-in control circuit 300 returns to the execution of step S3. That is, the focus pull-in control circuit 300 discriminates whether the read sum signal $R_{SUM}$ is larger than the near threshold value $TH_{NE}$ or not during a period of time when the optical disc 4 rotates once after the objective lens 23 was moved to the position on the focus adjustment trajectory corresponding to the driving value stored in the built-in register N by the execution of step S2. In other words, discrimination about whether the more the read sum signal $R_{SUM}$ is larger than the near threshold value $TH_{NE}$, the nearer the objective lens 23 has approached to the surface of the optical disc 4 while the optical disc 4 rotates once or not is made.

If it is decided in step S5 that the read sum signal $R_{SUM}$ is larger than the near threshold value $TH_{NE}$, the focus pull-in control circuit 300 repetitively executes the discrimination about whether the read sum signal $R_{SUM}$ is larger than the pull-in threshold value $TH_{PULL}$ or not until it is determined that the read sum signal $R_{SUM}$ is larger (step S6). That is, the apparatus waits until the objective lens 23 reaches the lower limit position of the capture range of the focusing servo loop. If it is decided in step S6 that the more the read sum signal $R_{SUM}$ is larger than the pull-in threshold value $TH_{PULL}$, that is, if the objective lens 23 has passed the lower limit position of the capture range of the focusing servo loop, the focus pull-in control circuit 300 generates the focus pull-in control signal FC of the logic level 0 and supplies it to the selector 10 (step S7). By the execution of step S7, the selector 10 supplies the phase compensation focusing error signal supplied from the equalizer 9 to the driver 12, thereby setting the focusing servo into the closed state. That is, if the more the read sum signal $R_{SUM}$ is larger than the near threshold value $TH_{NE}$, the nearer the objective lens 23 approaches to the surface of the optical disc 4 while the optical disc 4 rotates once, the objective lens 23 certainly reaches the position in the capture range of the focusing servo loop within the period of time of one rotation of the disc by the influence of the surface oscillation. The apparatus waits until the objective lens 23 exceeds the lower limit position in the capture range of the focusing servo loop within the period of time of one rotation of the disc and, thereafter, the focusing servo is closed. For example, in FIG. 6, the read sum signal $R_{SUM}$ becomes larger than the near threshold value $TH_{NE}$ at the fourth rotating period, and the distance between the disc surface and the objective lens 23 is reduced by the influence of the surface oscillation in the fourth rotating period. At a time point B in the 20th rotating period, the read sum signal $R_{SUM}$ becomes larger than the pull-in threshold value $TH_{PULL}$ and the objective lens 23 exceeds the lower limit position in the capture range of the focusing servo loop, so that the focusing servo is closed at the time point B.

In the focus pull-in operation in the embodiment, since the objective lens is made to approach to the optical disc step by step each time the disc rotates once, it takes time until the objective lens is pulled into the capture range of the focusing servo loop. It is, therefore, possible to construct the apparatus in a manner such that at a start point of the focus pull-in operation, the objective lens is continuously moved as shown in FIG. 3 and when the distance between the lens and the disc is narrowed to a certain extent, the objective lens is moved step by step each time the disc rotates once as shown in FIG. 6.

Figure 7:
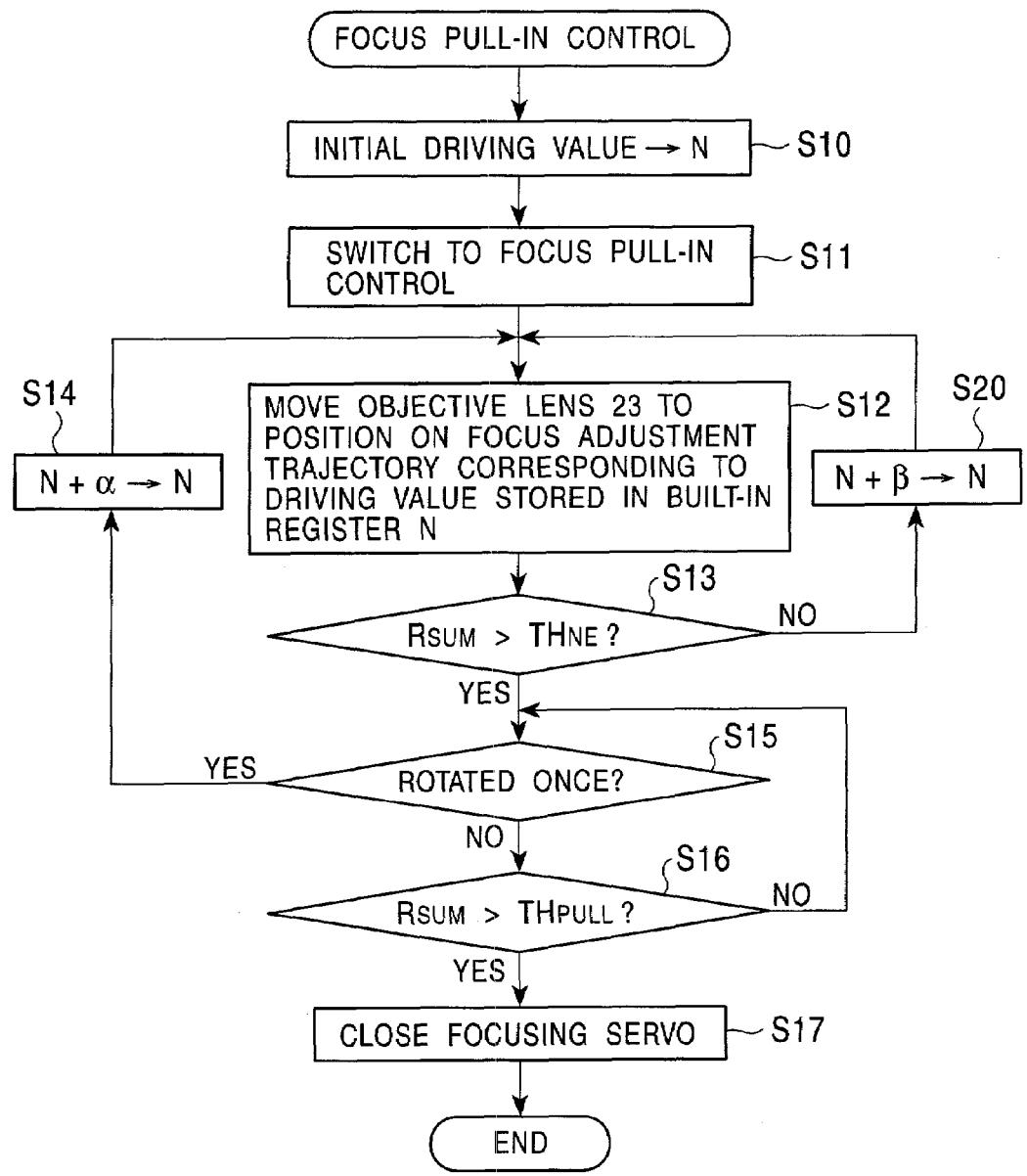
FIG. 7 is a diagram showing another example of the focus pull-in control flow which is executed by the disc player shown in FIG. 4.

FIG. 7 is a diagram showing another example of a focus pull-in control flow which is executed by the focus pull-in control circuit 300 mounted in the disc player shown in FIG. 4 in order to realize the focus pull-in operation.

In FIG. 7, first, the focus pull-in control circuit 300 stores the driving value for moving the objective lens 23 to a predetermined initial position on the focus adjustment trajectory into the built-in register N (not shown) (step S10). Subsequently, the focus pull-in control circuit 300 generates the focus pull-in control signal FC of the logic level 1 and supplies it to the selector 10 (step S11). By the execution of step S11, the selector 10 supplies the objective lens movement signal supplied from the objective lens movement signal generating circuit 110 to the driver 12. Subsequently, the focus pull-in control circuit 300 generates the movement driving control signal indicative of the driving value stored in the built-in register N and supplies it to the objective lens movement signal generating circuit 110 (step S12). By the execution of step S12, the focusing actuator 24 moves the objective lens 23 to the position on the focus adjustment trajectory corresponding to the driving value stored in the built-in register N. Subsequently, the focus pull-in control circuit 300 discriminates whether the read sum signal $R_{RUM}$ is larger than the near threshold value $TH_{NE}$ or not (step S13). The near threshold value $TH_{NE}$ is a value which can be obtained as a signal level of the read sum signal $R_{RUM}$ when the objective lens 23 exists at a relatively close position although it is away from the disc surface than the lower limit position in the capture range of the focusing servo loop. That is, in step S13, whether the objective lens 23 has been moved to the position near the surface of the optical disc 4 or not is discriminated.

In step S13, if it is determined that the read sum signal $R_{SUM}$ is not larger than the near threshold value $TH_{NE}$, the focus pull-in control circuit 300 sets a value obtained by adding a predetermined value β to the driving value stored in the built-in register N to a new driving value and overwrite-stores it into the built-in register N (step S20). After the execution of step S20, the focus pull-in control circuit 300 returns to the execution of step S12 and repetitively executes the operation as mentioned above. According to the repetitive execution of steps S12, S13, and S20, as shown in FIG. 8, the objective lens 23 approaches continuously to the surface of the optical disc 4.

If it is determined in step S13 that the read sum signal $R_{SUM}$ is larger than a near threshold value $TH_{NE}$, that is, if the objective lens 23 has been moved to the position near the surface of the optical disc 4, the focus pull-in control circuit 300 advances to the execution of next step S15. That is, the focus pull-in control circuit 300 discriminates whether the optical disc 4 has rotated once or not on the basis of the rotation detection pulse RP supplied from the rotation detector 170 (step S15). In step S15, if it is determined that the optical disc 4 has rotated once, the focus pull-in control circuit 300 sets the value obtained by adding the predetermined value α to the driving value stored in the built-in register N to a new driving value and overwrite-stores it into the built-in register N (step S14). After the execution of step S14, the focus pull-in control circuit 300 returns to the execution of step S12 and repetitively executes the operation as mentioned above. In this instance, according to the repetitive execution of steps S14, S12, and S15, as shown in FIG. 8, the objective lens 23 approaches to the surface of the optical disc 4 step by step by a distance corresponding to the predetermined value a each time the optical disc 4 rotates once.

If it is determined in step S15 that the optical disc 4 does not rotate once, the focus pull-in control circuit 300 discriminates whether the read sum signal $R_{SUM}$ is larger than the pull-in threshold value $TH_{PULL}$ or not (step S16). That is, whether the objective lens 23 has exceeded the lower limit position of the capture range of the focusing servo loop and entered the capture range or not is discriminated. If it is determined in step S16 that the read sum signal $R_{SUM}$ is smaller than the pull-in threshold value $TH_{PULL}$, that is, if the objective lens 23 exists at a position out of the capture range of the focusing servo loop, the focus pull-in control circuit 300 returns to the execution of step S15 and repetitively executes the operation as mentioned above. If it is determined in step S16 that the read sum signal $R_{SUM}$ is larger than the pull-in threshold value $TH_{PULL}$, that is, if the objective lens 23 exists in the capture range of the focusing servo loop, the focus pull-in control circuit 300 supplies the focus pull-in control signal FC of the logic level 0 to the selector 10 (step S17). By the execution of step S17, the selector 10 supplies the phase compensation focusing error signal supplied from the equalizer 9 to the driver 12, thereby setting the focusing servo into the closed state.

Figure 8:
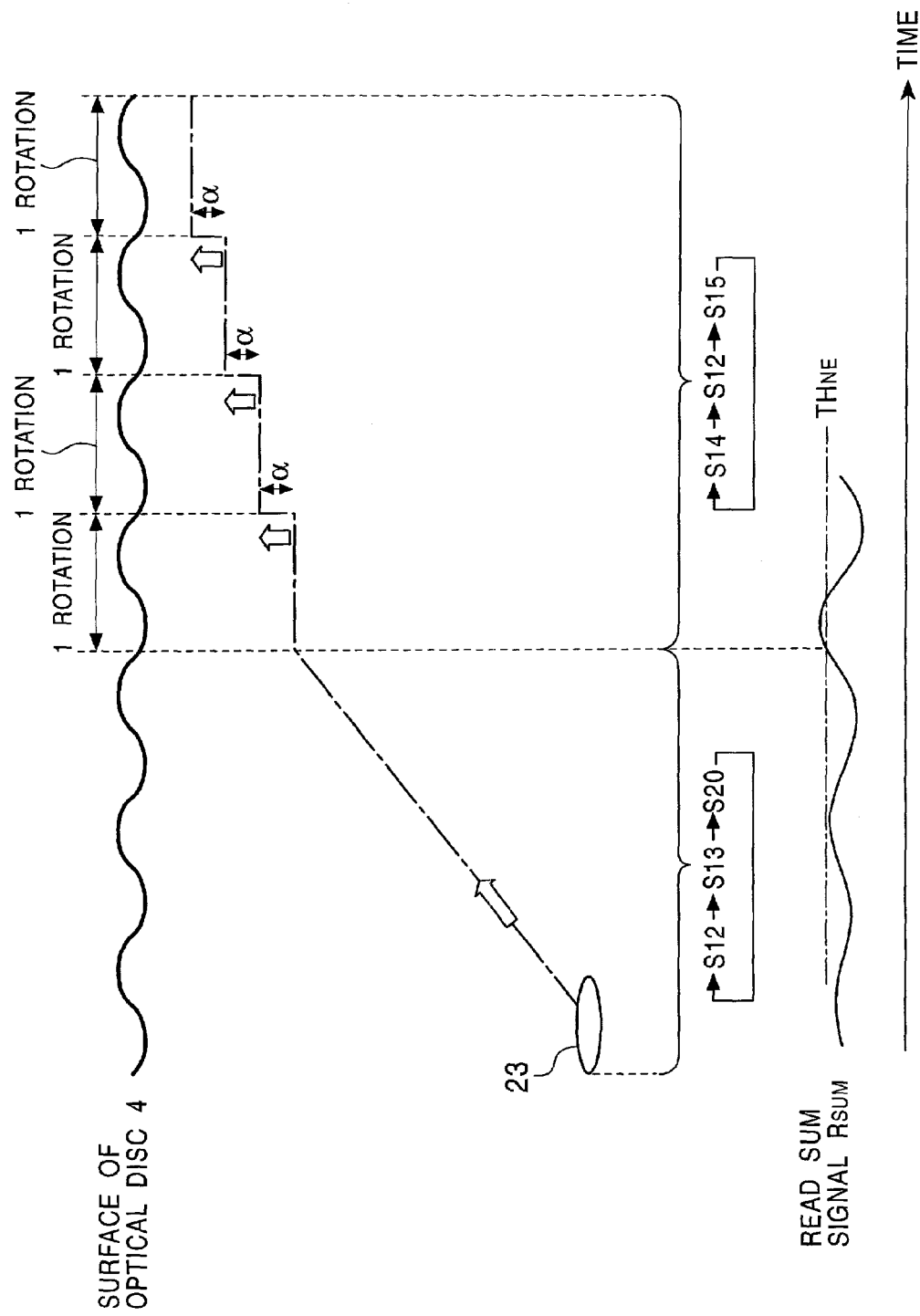
FIG. 8 is a diagram showing the focus pull-in operation by the execution of the focus pull-in control flow shown in FIG. 7.

As mentioned above, in the focus pull-in operation shown in FIG. 7, first, at a start point of the focus pull-in operation, the objective lens 23 is continuously moved at a high speed as shown in FIG. 8. When the distance between the lens and the disc becomes narrower than a predetermined interval during the above period of time, as shown in FIG. 8, the operating mode is switched to the pull-in operation in order to allow the objective lens 23 to approach to the optical disc step by step each time the disc rotates once. The pull-in operation, therefore, can be completed at a higher speed than that in the case where the objective lens is made to approach to the optical disc step by step for each rotation of the disc from the start point of the focus pull-in operation.

Figure 9:
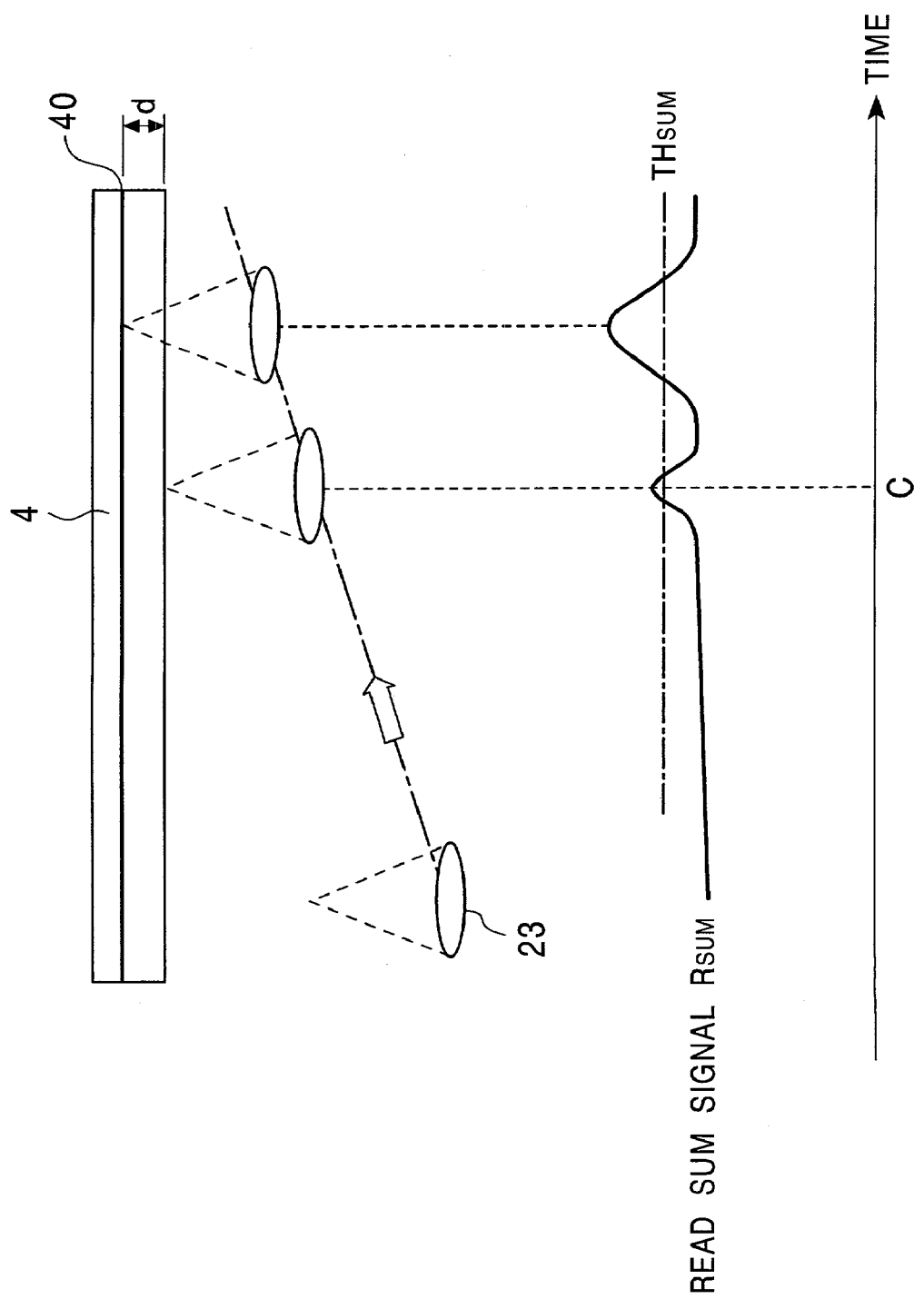
FIG. 9 is a diagram showing a level change of a read sum signal $R_{SUM}$ at the time when a focal point of a laser beam is focused onto the disc surface of an optical disc 4 and a level change of the read sum signal $R_{SUM}$ at the time when the focal point of the laser beam is focused onto a recording layer 40.

When the objective lens 23 is made to approach to the optical disc 4 as shown in FIG. 9, first, the focal point of the laser beam is focused onto the surface of the optical disc 4 (time point C). During the period of time, the signal level of the read sum signal $R_{SUM}$ rises as shown in FIG. 9 and becomes higher than that of a surface in-focus threshold value $TH_{SUM}$ at a point before the time point C. Further, when the objective lens 23 is made to approach toward the optical disc 4, the focal point onto the disc surface is deviated, so that the signal level of the read sum signal $R_{SUM}$ decreases. When the objective lens 23 is made to further approach toward the optical disc 4, the focal point is focused onto the recording layer 40 of the optical disc 4 and the signal level of the read sum signal $R_{SUM}$ rises again. In this instance, a position on the focus adjustment trajectory of the objective lens 23 at the time when the laser beam is focused onto the disc surface and a substrate thickness d between the disc surface and the recording layer 40 have been predetermined. By forcedly moving the objective lens 23 in the direction of the optical disc 4 by a predetermined distance at the point C when the disc surface is detected, therefore, the objective lens 23 can be promptly pulled in to a position near the capture range of the focusing servo loop.

Figure 10:
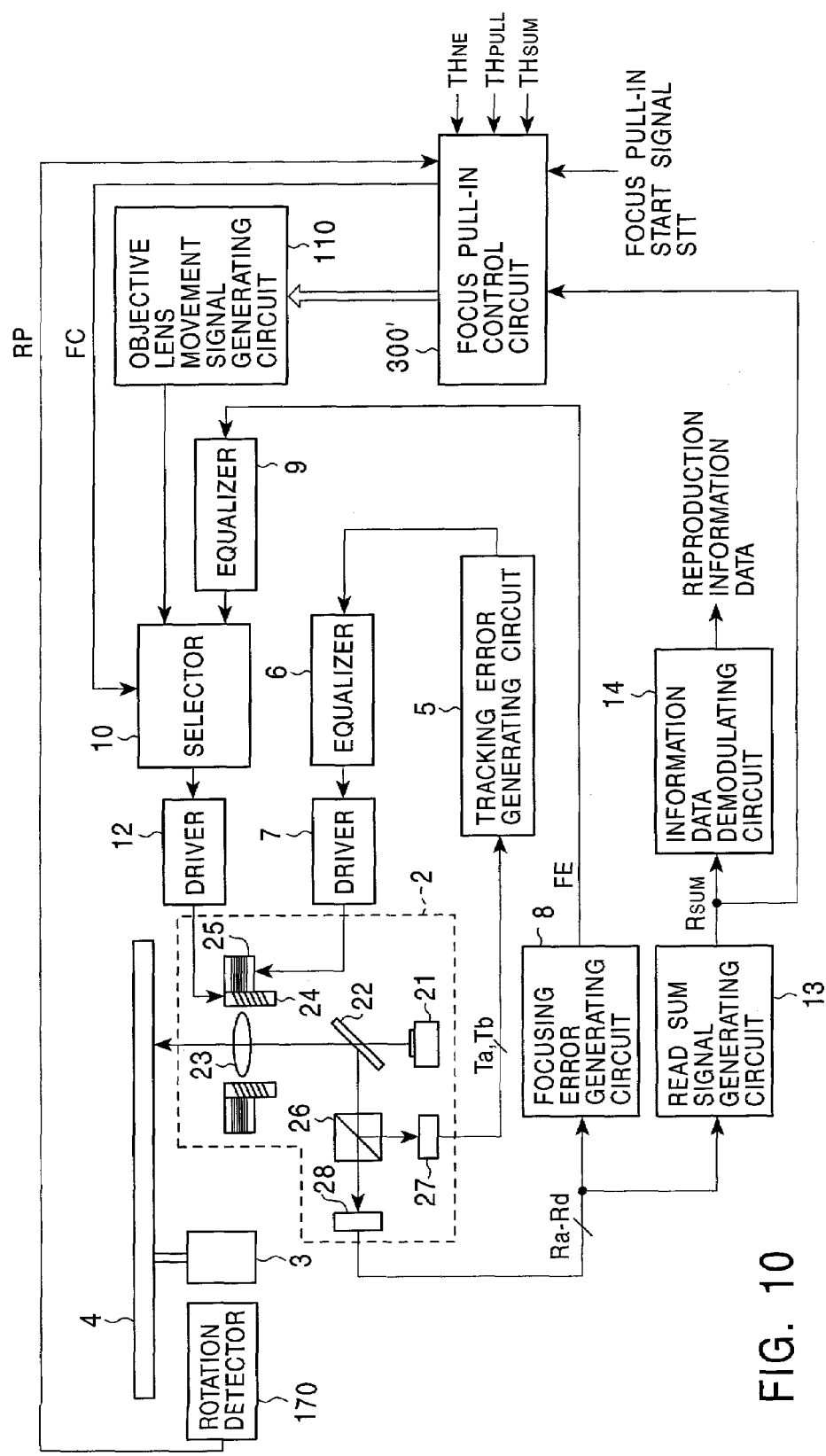
FIG. 10 is a diagram showing a construction of a disc player according to another embodiment of the invention.

FIG. 10 is a diagram showing another construction of a disc player formed in consideration of the above circumstances.

A construction of the disc player shown in FIG. 10 is substantially the same as that shown in FIG. 4 except for a point that a focus pull-in control circuit 300' is used in place of the focus pull-in control circuit 300 shown in FIG. 4. The control operation by the focus pull-in control circuit 300' will be, therefore, described hereinbelow.

Figure 11:
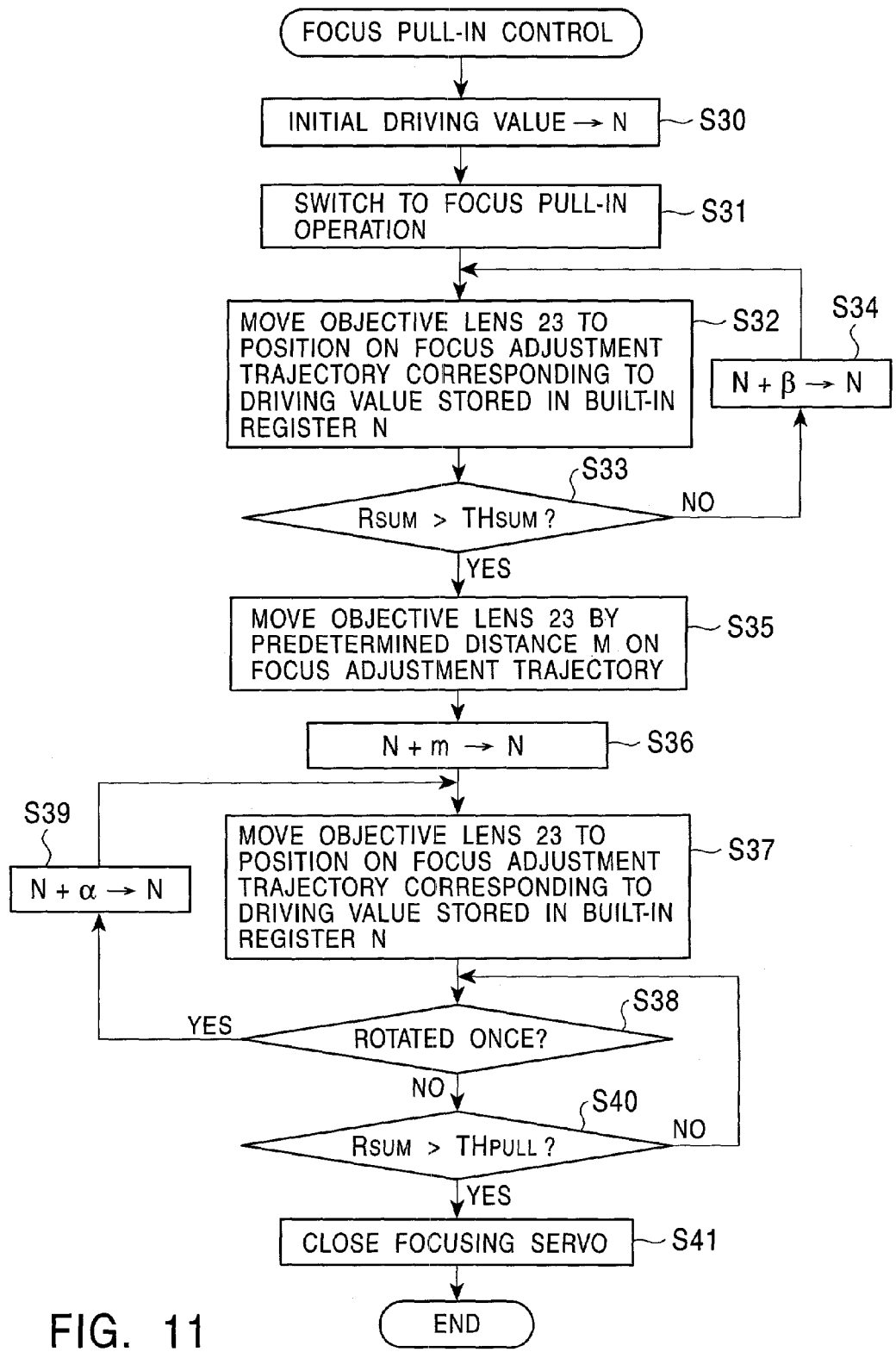
FIG. 11 is a diagram showing an example of a focus pull-in control flow which is executed by the disc player shown in FIG. 10.

FIG. 11 is a diagram showing a focus pull-in control flow which is executed in accordance with the focus pull-in start signal STT supplied from the system controller (not shown).

In FIG. 11, first, the focus pull-in control circuit 300' stores a driving value for moving the objective lens 23 to a predetermined initial position on the focus adjustment trajectory into the built-in register N (not shown) (step S30). Subsequently, the focus pull-in control circuit 300' generates the focus pull-in control signal FC of the logic level 1 and supplies it to the selector 10 (step S31). By the execution of step S31, the selector 10 supplies the objective lens movement signal supplied from the objective lens movement signal generating circuit 110 to the driver 12. Subsequently, the focus pull-in control circuit 300' generates the movement driving control signal indicative of the driving value stored in the built-in register N and supplies it to the objective lens movement signal generating circuit 110 (step S32). By the execution of step S32, the focusing actuator 24 moves the objective lens 23 to the position on the focus adjustment trajectory corresponding to the driving value stored in the built-in register N. Subsequently, the focus pull-in control circuit 300' discriminates whether the read sum signal $R_{SUM}$ is larger than the surface in-focus threshold value $TH_{SUM}$ or not (step S33). The surface in-focus threshold value $TH_{SUM}$ is the signal level of the read sum signal $R_{SUM}$ which is obtained just before the focal point of the laser beam is focused onto the disc surface when the objective lens 23 is made to gradually approach to the optical disc 4 as shown in FIG. 9. That is, just after the read sum signal $R_{SUM}$ becomes larger than the surface in-focus threshold value $TH_{SUM}$, the focal point of the laser beam is focused onto the disc surface of the optical disc 4. That is, in step S33, whether the focal point of the laser beam is focused onto the disc surface or not is discriminated. If it is determined in step S33 that the read sum signal $R_{SUM}$ is smaller than the surface in-focus threshold value $TH_{SUM}$, that is, if it is decided that the focal point of the laser beam is not set onto the disc surface, the focus pull-in control circuit 300' executes following step S34. That is, the focus pull-in control circuit 300' sets a value obtained by adding the predetermined value β to the driving value stored in the built-in register N to a new driving value and overwrite-stores it into the built-in register N (step S34). After the execution of step S34, the focus pull-in control circuit 300' returns to the execution of step S32 and repetitively executes the operation as mentioned above. According to the repetitive execution of steps S32, S33, and S34, as shown in FIG. 12, the objective lens 23 continuously approaches to the optical disc 4.

During the period of time, if it is determined in step S33 that the read sum signal $R_{SUM}$ is larger than the surface in-focus threshold value $TH_{SUM}$ that is, when the focal point of the laser beam is focused onto the disc surface, the focus pull-in control circuit 300' advances to the execution of subsequent step S35. That is, the focus pull-in control circuit 300' generates the movement driving control signal to move the objective lens 23 in the direction of the optical disc 4 by a predetermined distance M on the focus adjustment trajectory and supplies it to the objective lens movement signal generating circuit 110 (step S35). By the execution of step S35, the focusing actuator 24 moves the objective lens 23 by the predetermined distance M as shown in FIG. 12. Subsequently, the focus pull-in control circuit 300' sets a value obtained by adding a predetermined value m corresponding to the predetermined distance M to the driving value stored in the built-in,register N to a new driving value and overwrite-stores it into the built-in register N (step S36). Subsequently, the focus pull-in control circuit 300' generates the movement driving control signal indicative of the driving value stored in the built-in register N and supplies it to the objective lens movement signal generating circuit 110 (step S37). By the execution of step S37, the focusing actuator 24 moves the objective lens 23 to the position on the focus adjustment trajectory corresponding to the driving value stored in the built-in register N. Subsequently, the focus pull-in control circuit 300' discriminates whether the optical disc 4 has rotated once or not on the basis of the rotation detection pulse RP supplied from the rotation detector 170 (step S38). If it is determined in step S38 that the optical disc 4 has rotated once, the focus pull-in control circuit 300' sets a value obtained by adding the predetermined value α to the driving value stored in the built-in register N to a new driving value and overwrite-stores it into the built-in register N (step S39). After the execution of step S39, the focus pull-in control circuit 300' returns to the execution of step S37 and repetitively executes the operation as mentioned above. According to the repetitive execution of steps S37, S38, and S39, as shown in FIG. 12, the objective lens 23 approaches to the disc surface step by step by the distance corresponding to the predetermined value α each time the optical disc rotates once.

If it is decided in step S38 that the optical disc does not rotate once, the focus pull-in control circuit 300' discriminates whether the read sum signal $R_{SUM}$ is larger than the pull-in threshold value $TH_{PULL}$ or not (step S40). If it is determined in step S40 that the read sum signal $R_{SUM}$ is smaller than the pull-in threshold value $TH_{PULL}$, the focus pull-in control circuit 300' returns to the execution of step S38 and repetitively executes the operation as mentioned above. If it is determined in step S40 that the read sum signal $R_{SUM}$ is larger than the pull-in threshold value $TH_{PULL}$, that is, if the objective lens 23 has exceeded the lower limit position in the capture range of the focusing servo loop, the focus pull-in control circuit 300' generates the focus pull-in control signal FC of the logic level 0 and supplies it to the selector 10 (step S41). By the execution of step S41, the selector 10 supplies the phase compensation focusing error signal supplied from the equalizer 9 to the driver 12, thereby setting the focusing servo into the closed state.

Figure 12:
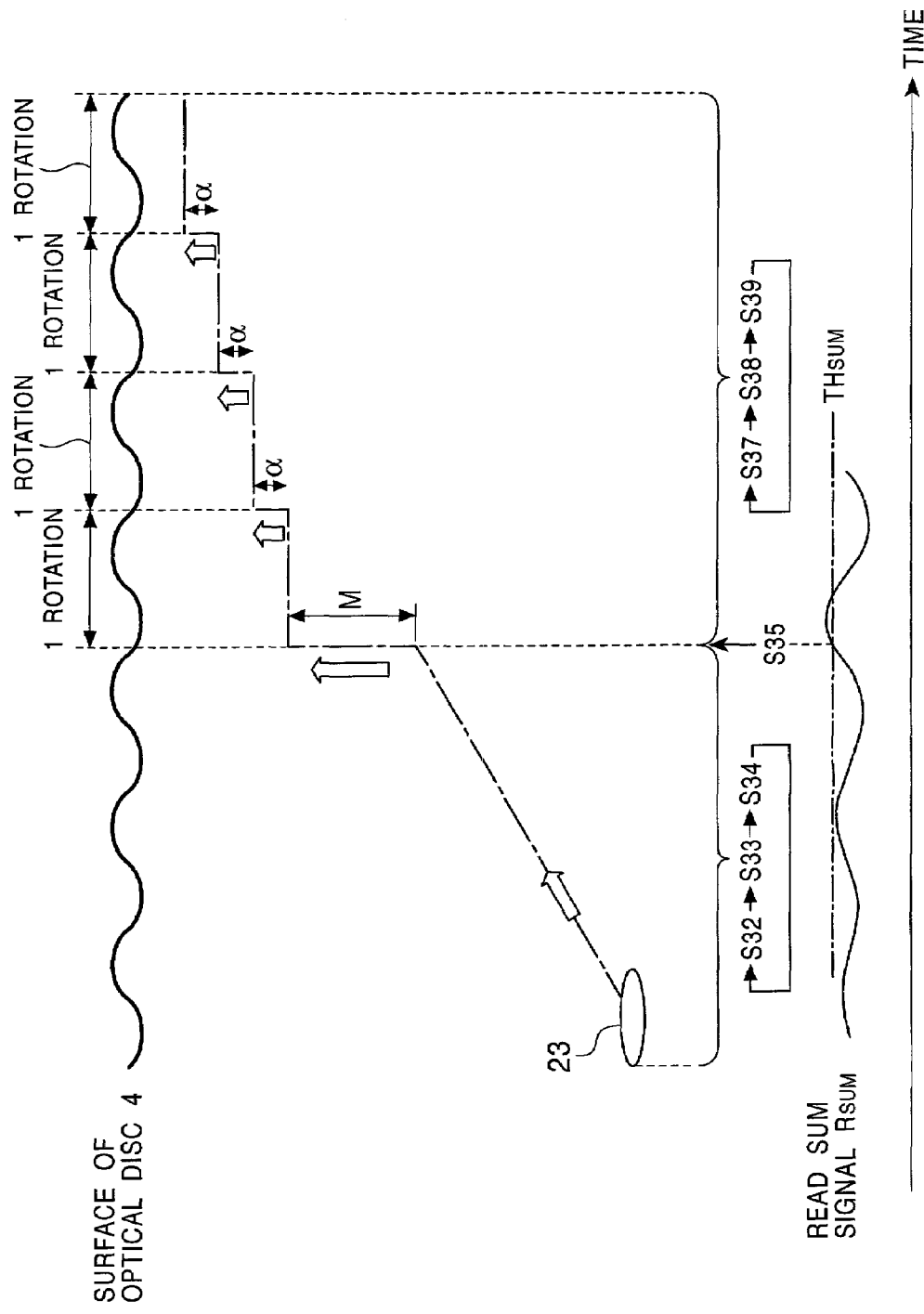
FIG. 12 is a diagram showing the focus pull-in operation by the execution of the focus pull-in control flow shown in FIG. 11.

As mentioned above, according to the focus pull-in as shown in FIG. 11, as shown in FIG. 12, at a point when the focal point of the objective lens 23 is focused onto the surface of the optical disc 4, the objective lens 23 is forcedly moved in the direction of the optical disc 4 by the predetermined distance M. The objective lens 23 can be, consequently, promptly moved to a position near the capture range of the focusing servo loop without allowing the objective lens 23 to come into contact with the optical disc 4. In the embodiment, although whether the laser beam has been focused onto the surface of the optical disc 4 or not is discriminated on the basis of the signal level of the read sum signal $R_{SUM}$ the discrimination can be also made from the focusing error signal FE.

In the embodiment, at the time of the focus pull-in operation, when the objective lens reaches the position near the capture range of the focusing servo loop, the objective lens 23 is allowed to approach to the optical disc step by step by a predetermined distance at a time synchronously with the rotation of the disc. During the period of time, the objective lens 23 can be also allowed to approach continuously to the optical disc if an approach speed is sufficiently low.

In the embodiment, although a moving speed of the objective lens has been set to be constant for a period of time until the focusing servo is closed after the objective lens was moved to the position near the capture range of the focusing servo loop, it is not always necessary to set the moving speed to be constant.

Figure 13:
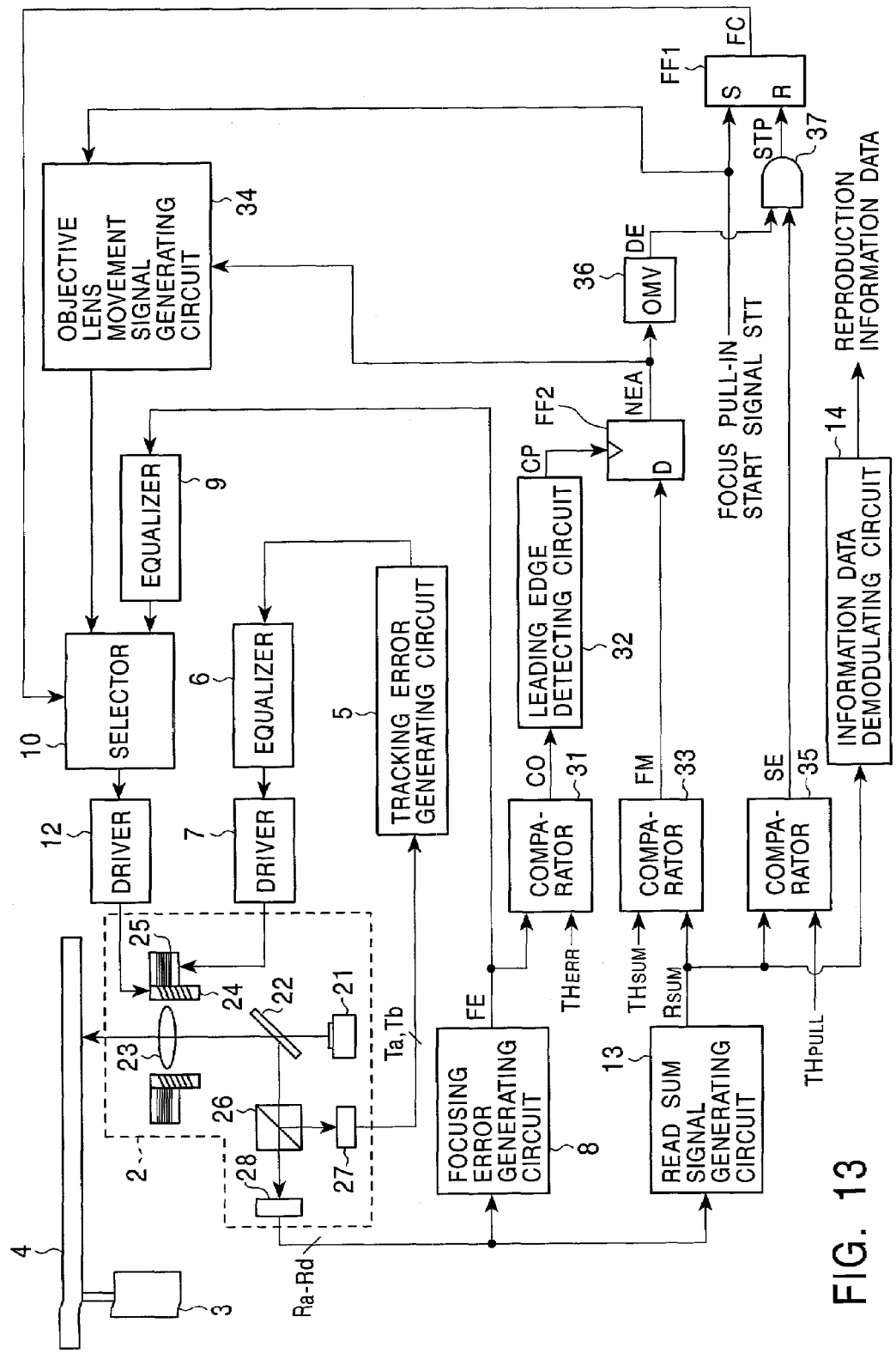
FIG. 13 is a diagram showing the construction of another embodiment of the disc player according to the invention.

FIG. 13 is a diagram showing a construction of a disc player in which a focus pull-in apparatus according to another embodiment of the invention made in consideration of the above viewpoint has been mounted.

In FIG. 13, since the operation of each of the pickup 2, spindle motor 3, optical disc 4, tracking error generating circuit 5, equalizer 6, driver 7, focusing error generating circuit 8, equalizer 9, selector 10, driver 12, read sum signal generating circuit 13, and information data demodulating circuit 14 is substantially the same as that shown in FIG. 1, their descriptions are omitted here.

Figure 14:
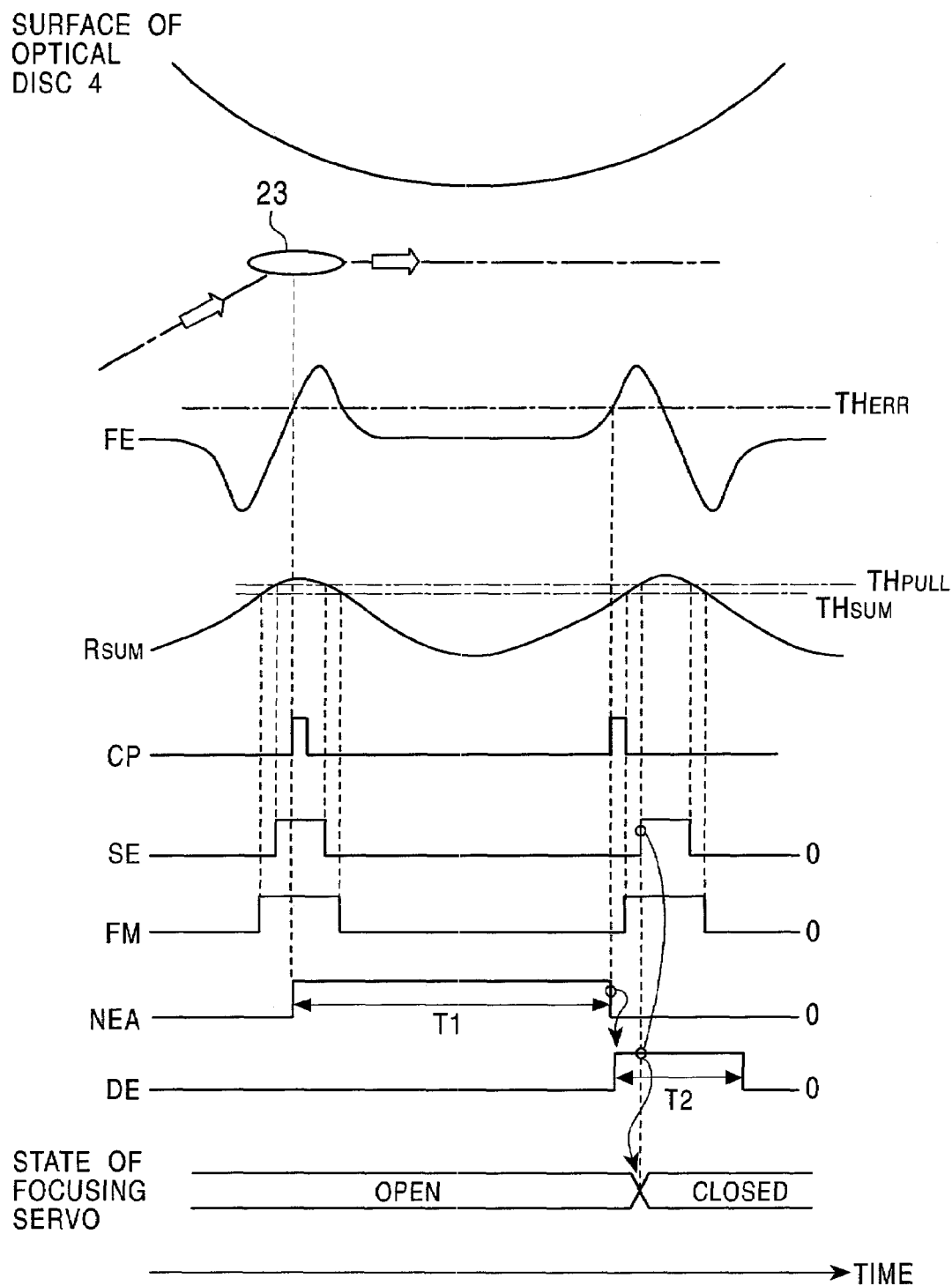
FIG. 14 is a diagram showing the focus pull-in operation which is executed by the disc player shown in FIG. 13.

When the signal level of the focusing error signal FE is smaller than that of an error threshold value $TH_{ERR}$, a comparator 31 generates a focal point over signal CO of the logic level 0 and supplies it to a leading edge detecting circuit 32. When the signal level of the focusing error signal FE is larger than that of the error threshold value $TH_{ERR}$, the comparator 31 generates the focal point over signal CO of the logic level 1 and supplies it to the leading edge detecting circuit 32. That is, as the objective lens 23 approaches to the disc surface, as shown in FIG. 14, the focusing error signal FE changes in an S-character shape at points before and after an in-focus time point (shown by a blank circle). When the objective lens 23 is gradually away from a state where it is nearest to the surface of the optical disc 4, the focusing error signal FE changes again in an S-character shape as shown in FIG. 14 at points before and after the in-focus time point. At this time, in an interval where the peak value on the positive side is larger than the error threshold value $TH_{ERR}$ in the S-character shaped interval of the focusing error signal FE, the objective lens 23 exceeds the focal point and exists at a position near the disc surface side. That is, due to the influence of the surface oscillation of the optical disc 4, the objective lens 23 exists at a position near the surface side of the optical disc 4 than the focal point. During the period of time, the focal point over signal CO of the logic level 1 is generated from the comparator 31.

The leading edge detecting circuit 32 detects only a leading edge portion of the focal point over signal CO, generates a clock pulse CP as shown in FIG. 14 at its detection timing, and supplies it to a clock input terminal of a D flip-flop FF2. When the read sum signal $R_{SUM}$ is smaller than the surface in-focus threshold value $TH_{SUM}$, a comparator 33 generates a focusing range signal FM of the logic level 0 and supplies it to a D terminal of the D flip-flop FF2. The D flip-flop FF2 fetches the focusing range signal FM at the timing of the clock pulse CP and supplies it as a nearest approach signal NEA to an objective lens movement signal generating circuit 34 and a one-shop multivibrator 36 (hereinafter, simply abbreviated to an OMV 36). As shown in FIG. 14, therefore, the nearest approach signal NEA which is set to the logic level 1 for a period T1 during which the distance between the objective lens 23 and the disc surface is smaller than a predetermined interval is generated from the D flip-flop FF2. In accordance with the timing when the nearest approach signal NEA is shifted from the logic level 1 to the logic level 0, the OMV 36 generates a removal signal DE which is set to the logic level 1 for a period T2 as shown in FIG. 14 and supplies it to a gate 37.

A comparator 35 compares the signal level of the read sum signal $R_{SUM}$ and the pull-in threshold value $TH_{PULL}$. When the signal level of the read sum signal $R_{SUM}$ is smaller, the comparator 35 supplies the signal SE in the servo capture range of the logic level 0 to the gate 37. When the signal level of the read sum signal $R_{SUM}$ is larger, the comparator 35 supplies the signal SE in the servo capture range of the logic level 1 to the gate 37. The pull-in threshold value $TH_{PULL}$ is a value which can be obtained as a signal level of the read sum signal $R_{SUM}$ when the objective lens 23 exists at the lower limit position in the capture range of the focusing servo loop (that is, the farthest position from the disc surface).

Only when both of the signal SE in the servo capture range and the removal signal DE are at the logic level 1, the gate 37 generates the objective lens movement stop signal STP of the logic level 1 and supplies it to the R terminal of the RS flip-flop FF1. When the focus pull-in start signal STT is supplied to the S terminal of the RS flip-flop FF1, the RS flip-flop FF1 continuously supplies the focus pull-in control signal FC of the logic level 1 to the selector 10 in order to execute the focus pull-in operation. The focus pull-in start signal STT is generated from the system controller (not shown), for example, when the power source of the disc player is turned on or when the recording layer as a target to be read is changed to another recording layer. When the objective lens movement stop signal STP of the logic level 1 is supplied to the R terminal, the RS flip-flop FF1 continuously supplies the focus pull-in control signal FC of the logic level 0 to stop the movement of the focus pull-in operation to the selector 10.

When the focus pull-in start signal STT is supplied from the system controller (not shown), the objective lens movement signal generating circuit 34 generates an objective lens movement signal to move the objective lens 23 in the direction of the optical disc 4 at a predetermined speed V1 and supplies it to the selector 10. While the nearest approach signal NEA of the logic level 1 is supplied from the D flip-flop FF2, the objective lens movement signal generating circuit 34 generates an objective lens movement signal to stop the objective lens 23 and supplies it to the selector 10.

While the focus pull-in control signal FC of the logic level 0 to stop the focus pull-in operation is supplied to the selector 10, the selector 10 relay-supplies the phase compensation focusing error signal supplied from the equalizer 9 to the driver 12. While the focus pull-in control signal FC of the logic level 1 to execute the focus pull-in operation is supplied to the selector 10, the selector 10 relay-supplies the objective lens movement signal supplied from the objective lens movement signal generating circuit 34 to the driver 12.

The focus pull-in operation which is executed in the disc player shown in FIG. 13 will now be described with reference to FIG. 15.

Figure 15:
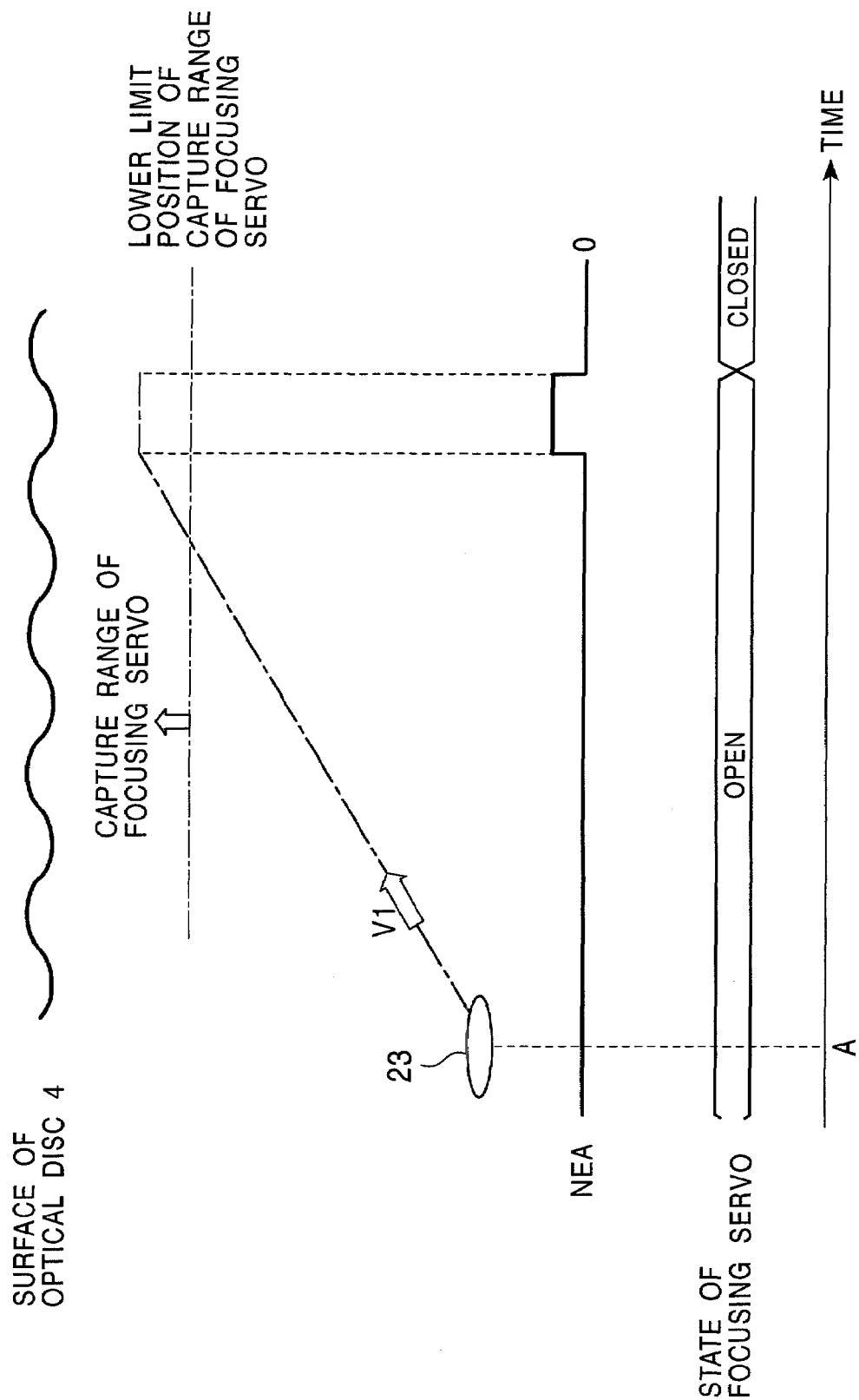
FIG. 15 is a diagram showing the focus pull-in operation which is executed by the disc player shown in FIG. 13.

In order to focus the laser beam onto a certain recording layer of the optical disc 4, the system controller (not shown) generates the focus pull-in start signal STT at the time point A shown in FIG. 15. In response to the focus pull-in start signal STT, the RS flip-flop FF1 generates the focus pull-in control signal FC of the logic level 1. In response to the focus pull-in control signal FC of the logic level 1, the selector 10 supplies the objective lens movement signal supplied from the objective lens movement signal generating circuit 34 to the driver 12. The focusing servo is, therefore, set into the open state and the focusing actuator 24 starts the driving for allowing the objective lens 23 to forcedly approach to the surface of the optical disc 4 at the predetermined speed V1 as shown in FIG. 15. Just after the driving, since the objective lens 23 exists at a position which is relatively away from the optical disc 4, light intensity of the reflected light from the optical disc 4 is low. The signal level of the read sum signal $R_{SUM}$ obtained on the basis of the reflected light, therefore, is lower than both of the pull-in threshold value $TH_{PULL}$ and the surface in-focus threshold value $TH_{SUM}$. After that, when the objective lens 23 exceeds the lower limit position of the capture range of the focusing servo loop, the light intensity of the reflected light from the optical disc 4 rises and the amplitude of the read sum signal $R_{SUM}$ increases. During the period of time, when the distance between the optical disc 4 and the objective lens 23 approaches to the minimum interval due to the influence of the surface oscillation of the optical disc 4, at a point just before it, the signal level of the read sum signal $R_{SUM}$ temporarily exceeds the levels of the pull-in threshold value $TH_{PULL}$ and the surface in-focus threshold value $TH_{SUM}$ as shown in FIG. 14. When the distance between the optical disc 4 and the objective lens 23 becomes shortest and the objective lens 23 is, subsequently, away from the optical disc 4, the signal level of the read sum signal $R_{SUM}$ again exceeds the levels of the pull-in threshold value $TH_{PULL}$ and the surface in-focus threshold value $TH_{SUM}$. While the distance between the objective lens 23 and the optical disc 4 is smaller than the predetermined interval, therefore, the flip-flop FF2 generates the nearest approach signal NEA of the logic level 1. During a period of time when the nearest approach signal NEA is at the logic level 1, therefore, the objective lens 23 stops the movement as shown in FIG. 15. Just after the objective lens 23 approached to the position that is nearest to the surface of the optical disc 4, the removal signal DE at the logic level 1 is generated from the OMV 36 as shown in FIG. 14. The objective lens movement stop signal STP of the logic level 1 is, thus, supplied to the RS flip-flop FF1 and the focusing servo is shifted to the closed state as shown in FIG. 14.

As mentioned above, in the disc player shown in FIG. 13, after the objective lens was moved to the capture range of the focusing servo loop at a predetermined speed, for a period of time when the distance between the objective lens and the disc surface is smaller than the predetermined interval due to the influence of the surface oscillation, the movement of the objective lens is stopped. Just after the objective lens approached to the position that is nearest to the disc surface, the focusing servo is shifted to the closed state. While the contact of the objective lens with the disc surface is prevented, therefore, the objective lens can be promptly pulled into to the capture range of the focusing servo loop and the focusing servo can be made operative.

In the embodiment, although the movement of the objective lens is stopped while the objective lens approaches to the disc surface and is subsequently away therefrom, a moving speed of the objective lens can be also reduced. In this instance, the moving speed is properly changed in accordance with the approach speed at the time when the objective lens 23 approaches to the disc surface due to the influence of the surface oscillation.

Figure 16:
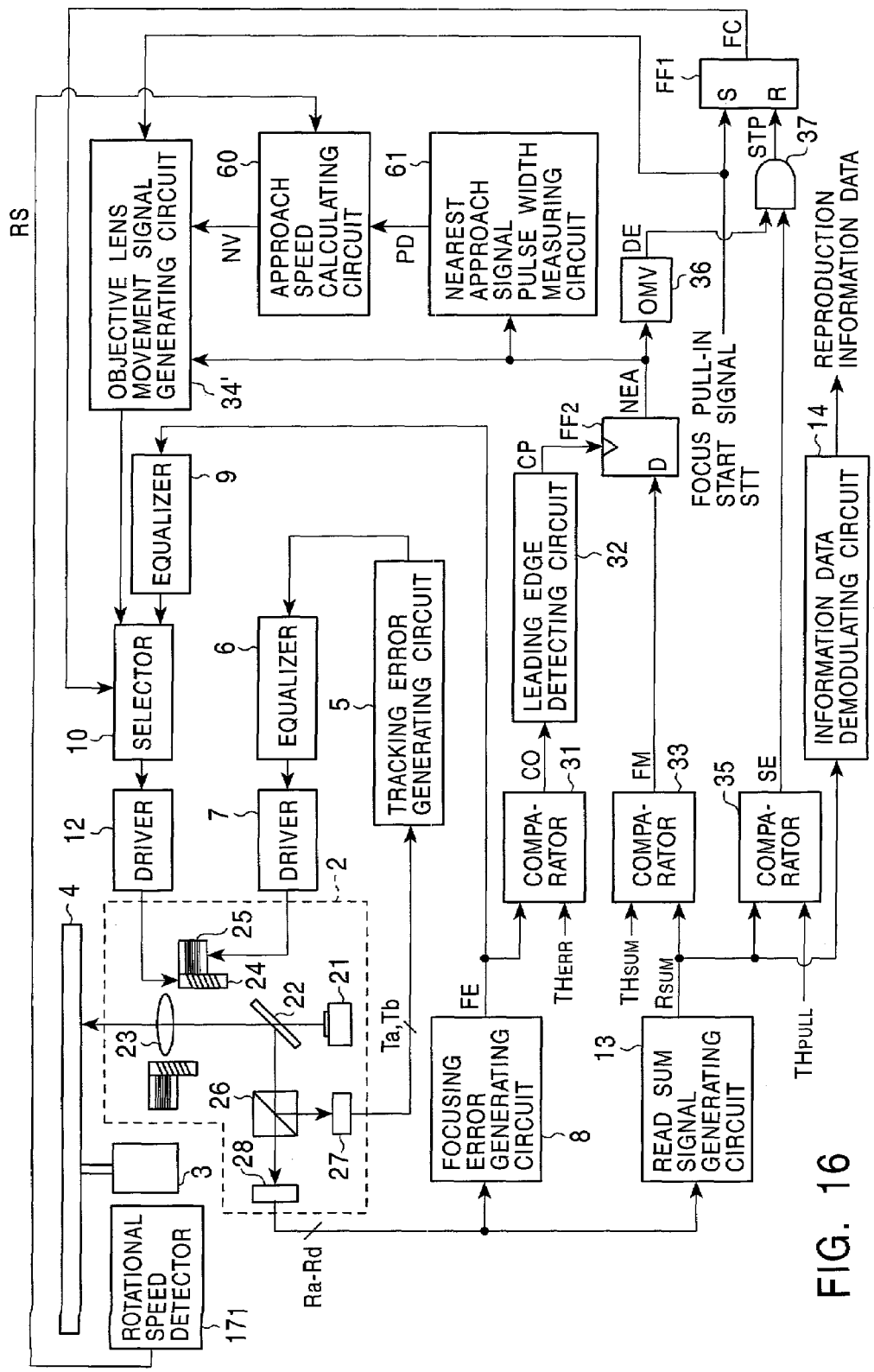
FIG. 16 is a diagram showing a modification of the disc player shown in FIG. 13.

FIG. 16 is a diagram showing a construction of a disc player according to another embodiment of the invention which has been made in consideration of the above viewpoint.

The disc player shown in FIG. 16 is formed by adding a rotational speed detector 171, an approach speed calculating circuit 60, and a nearest approach signal pulse width measuring circuit 61 to the disc player shown in FIG. 13 and the other construction is substantially the same as that shown in FIG. 13.

The nearest approach signal pulse width measuring circuit 61 starts the measuring operation from a point when the nearest approach signal NEA is shifted from the logic level 0 to the logic level 1 and continues the measuring operation while the nearest approach signal NEA is at the logic level 1. The nearest approach signal pulse width measuring circuit 61 sets a current measurement value to nearest approach pulse width data PD indicative of a pulse width of the nearest approach signal NEA and successively supplies it to the approach speed calculating circuit 60. The rotational speed detector 171 detects a rotational speed at which the optical disc 4 is rotated by the spindle motor 3 and supplies a rotational speed signal RS indicative of the rotational speed to the approach speed calculating circuit 60. The approach speed calculating circuit 60 obtains an approach speed at which the objective lens 23 approaches to the disc surface of the optical disc 4 on the basis of the rotational speed signal RS and the nearest approach pulse width data PD and supplies an approach speed signal NV indicative of the approach speed to an objective lens movement signal generating circuit 34'. When the focus pull-in start signal STT is generated from the system controller (not shown), the objective lens movement signal generating circuit 34' supplies the objective lens movement signal to move the objective lens 23 in the direction of the optical disc 4 at the predetermined speed V1 to the selector 10. While the nearest approach signal NEA of the logic level 1 as shown in FIG. 14 is supplied, the objective lens movement signal generating circuit 34' supplies the objective lens movement signal to move the objective lens 23 in the direction of the optical disc 4 at a speed V2 (V1>V2) corresponding to the approach speed signal NV to the selector 10.

That is, while the objective lens 23 approaches to the disc surface and is away from the disc due to the influence of the surface oscillation of the disc (while the nearest approach signal NEA maintains the logic level 1), the moving speed of the objective lens 23 is changed in accordance with the approach speed. While the contact of the objective lens with the disc surface is prevented, therefore, the objective lens can be promptly pulled into to the capture range of the focusing servo loop.

A contact retreating component for retreating the contact of the objective lens with the disc surface can be also mounted for the purpose of preparing for a case where the surface oscillation of the disc increases irregularly.

Figure 17:
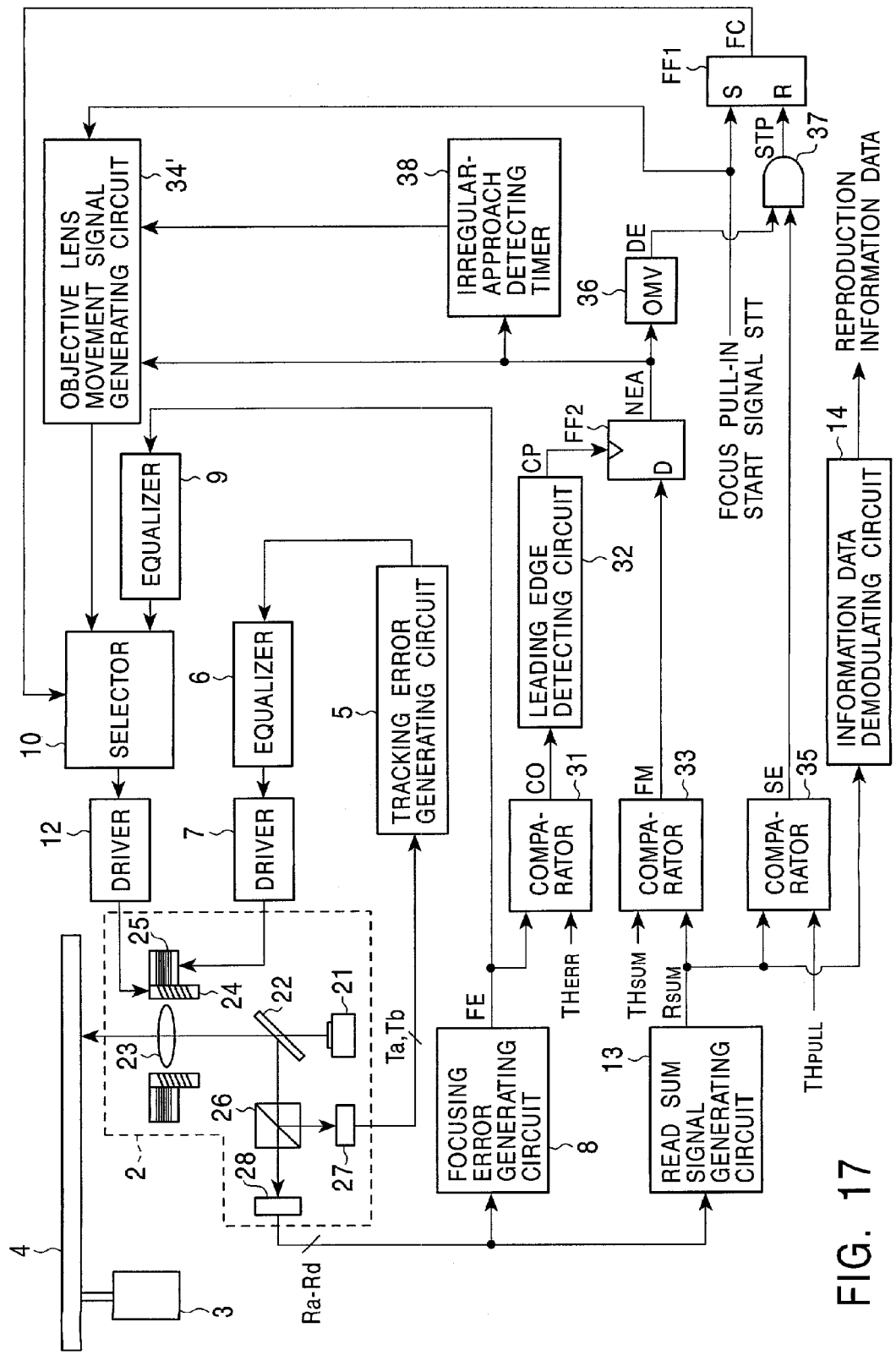
FIG. 17 is a diagram showing a construction in the case where contact retreating component is mounted in the disc player shown in FIG. 13.

FIG. 17 is a diagram showing an example of a construction of a disc player in which the contact retreating component has been mounted. The disc player shown in FIG. 17 is formed by mounting an irregular approach detecting timer 38 into the disc player shown in FIG. 13. The contact retreating component is formed by the irregular approach detecting timer 38 and the objective lens movement signal generating circuit 34'.

The irregular approach detecting timer 38 starts the measuring operation from a point when the nearest approach signal NEA is shifted from the logic level 0 to the logic level 1 and continues the measuring operation while the nearest approach signal NEA is at the logic level 1. In this instance, when a measurement value exceeds a predetermined value, the irregular approach detecting timer 38 supplies an irregular approach detection signal to the objective lens movement signal generating circuit 34' in order to notify the circuit 34' of the occurrence of the irregular approach. When the irregular approach detection signal is supplied from the irregular approach detecting timer 38, the objective lens movement signal generating circuit 34' generates the objective lens movement signal to move the objective lens 23 in the direction so as to be away from the disc surface of the optical disc 4 by a predetermined distance and supplies it to the selector 10.

That is, when the distance between the objective lens 23 and the surface of the optical disc 4 is irregularly small, a period of time during which the nearest approach signal NEA maintains the logic level 1 becomes long. The period of time during which the nearest approach signal NEA maintains the logic level 1 is, therefore, measured by the irregular approach detecting timer 38 and, when the period of time exceeds a predetermined period, it is determined that the objective lens 23 has approached irregularly to the disc surface. The objective lens 23 is forcedly moved in the direction so as to be away from the disc surface.

If the focusing servo is not locked normally after completion of the focus pull-in, the objective lens 23 is retreated to a position where it is relatively close to the disc surface and even if the disc surface oscillation is large, there is no fear of contact with the disc surface. The focus pull-in operation is executed again in order to allow the objective lens to approach to the disc surface step by step from that position or to allow the objective lens to approach to the disc surface from that position after the speed is reduced as shown in FIG. 8 or 12. The position to which the objective lens is retreated can be also set to a position that is relatively far from the disc surface. In this instance, the focus pull-in operation is executed in order to allow the objective lens to approach to the disc surface at a high speed until the objective lens is moved into the capture range of the focusing servo loop.

As described above, according to the invention the occurrence of the inconvenience that the objective lens comes into contact with the disc surface, or the like can be surely prevented, so that the objective lens can be promptly pulled into the capture range of the focusing servo loop.

This application is based on Japanese Patent Application No. 2001-305151 which is herein incorporated by reference.

What is claimed is:

1. An optical disc player for reproducing recording information recorded on an optical disc based on reflection light obtained when a laser beam condensed by an objective lens is projected onto a recording surface of said optical disc, comprising:
    a surface oscillation detecting component for detecting a change in distance between said objective lens and the surface of said optical disc as a surface oscillation of said optical disc;
    an objective lens moving component for gradually moving said objective lens forcedly, from a position which is away from the surface of said optical disc and outside a capture range of a focus servo, toward the surface of said optical disc; and
    an objective lens movement stop control component for stopping a moving operation which is executed by said objective lens moving component when said objective lens has reached the capture range of the focusing servo loop by the moving operation by said objective lens moving component and it is detected by said surface oscillation detecting component that a distance between said objective lens and said surface is at a minimum interval or is changing in a widening direction.

2. A player according to claim 1, wherein said objective lens movement stop control component stops the moving operation which is executed by said objective lens moving component when said objective lens has reached the capture range of the focusing servo loop and it is detected by said surface oscillation detecting component that the distance between said objective lens and said surface is at the minimum interval.

3. A player according to claim 1, further comprising a component for setting said focusing servo to an open state upon starting of the moving operation by said objective lens moving component and setting said focusing servo into a closed state just after a stop of said moving operation.

4. A player according to claim 1, wherein said objective lens moving component moves said objective lens toward the surface of said optical disc by a predetermined distance each time said optical disc rotates once.

5. A player according to claim 1, wherein said objective lens moving component continuously moves said objective lens from the position which is apart from the surface of said optical disc and outside the capture range of the focusing servo loop to a position just before the capture range of said focusing servo and, thereafter, moves said objective lens step by step by a predetermined distance toward the surface of said optical disc each time said optical disc rotates once.

6. A player according to claim 1, wherein said objective lens moving component moves said objective lens gradually and continuously from the position which is apart from the surface of said optical disc and outside the capture range of the focusing servo loop to a position just before the capture range of said focusing servo, thereafter, steeply moves said objective lens toward the surface of said optical disc by a predetermined distance and, subsequently, moves said objective lens step by step by a predetermined distance toward the surface of said optical disc each time said optical disc rotates once.

7. A player according to claim 1, wherein said objective lens moving component moves said objective lens from the position which is apart from the surface of said optical disc and outside the capture range of the focusing servo loop to the capture range of said focusing servo at a first predetermined speed and, thereafter, changes a speed of movement of said objective lens to a second predetermined speed lower than said first predetermined speed for a period of time when the distance between said objective lens and said surface detected by said surface oscillation detecting component is smaller than a predetermined distance.

8. A player according to claim 7, further comprising an approach speed detecting component for obtaining an approach speed at which said objective lens approaches to the surface of said optical disc, and wherein said second predetermined speed is a speed according to said approach speed.

9. A player according to claim 8, further comprising a contact retreating component for forcedly moving said objective lens in a direction so as to be away from the surface of said optical disc when said period is longer than a predetermined period.

* * * * *